(12) United States Patent
Croon et al.

(10) Patent No.: US 10,101,056 B2
(45) Date of Patent: Oct. 16, 2018

(54) FACILITY FOR PRODUCING A HOT LIQUID, IN PARTICULAR HOT WATER

(71) Applicant: ACV INTERNATIONAL, Dworp (BE)

(72) Inventors: Marco Croon, Knokke-Heist (BE); Michel Donck, Linkebeek (BE); Patrick Forret, Genly (BE)

(73) Assignee: ACV INTERNATIONAL (BE)

( * ) Notice: Subject to any disclaimer, the term of this patent is extended or adjusted under 35 U.S.C. 154(b) by 334 days.

(21) Appl. No.: 14/841,230

(22) Filed: Aug. 31, 2015

(65) Prior Publication Data

US 2015/0369516 A1    Dec. 24, 2015

Related U.S. Application Data

(63) Continuation-in-part of application No. PCT/BE2014/000011, filed on Feb. 28, 2014.

(30) Foreign Application Priority Data

Mar. 1, 2013   (EP) .................................... 13001034

(51) Int. Cl.
| | |
|---|---|
| *F24H 1/20* | (2006.01) |
| *F24D 3/08* | (2006.01) |
| *F28F 3/04* | (2006.01) |
| *F28F 3/12* | (2006.01) |
| *F28D 7/00* | (2006.01) |
| *F28D 20/00* | (2006.01) |
| *F28D 1/02* | (2006.01) |

(52) U.S. Cl.
CPC .............. *F24H 1/205* (2013.01); *F24D 3/082* (2013.01); *F24H 1/208* (2013.01); *F28D 1/0213* (2013.01); *F28D 7/005* (2013.01); *F28D 20/0034* (2013.01); *F28F 3/042* (2013.01); *F28F 3/12* (2013.01); *F28D 20/0039* (2013.01); *F28D 2020/0078* (2013.01); *Y02E 60/142* (2013.01)

(58) Field of Classification Search
CPC .................................. F24H 1/20; F24H 1/205
See application file for complete search history.

(56) References Cited

U.S. PATENT DOCUMENTS 1,977,809 A * 10/1934 Sutter ...................... B60H 1/18
                                                           165/154
3,278,122 A    10/1966 Laing
(Continued)

FOREIGN PATENT DOCUMENTS

| | | |
|---|---|---|
| DE | 19707859 A1 | 9/1998 |
| DE | 20317011 U1 | 4/2004 |

(Continued)

OTHER PUBLICATIONS

FR2605718A1—machine translation.*
(Continued)

*Primary Examiner* — Nathaniel Herzfeld
(74) *Attorney, Agent, or Firm* — Hovey Williams LLP; Joan Optican Herman

(57) ABSTRACT

A facility for producing a hot liquid comprising a primary exchanger extending into a vessel, said primary exchanger being formed by a substantially cylindrical inner wall and a substantially outer wall, at least one of which having at least two circular ribs.

27 Claims, 17 Drawing Sheets

(56) References Cited

U.S. PATENT DOCUMENTS

| | | | | |
|---|---|---|---|---|
| 3,834,448 | A | * | 9/1974 | Cooksley .............. C02F 1/04 165/154 |
| 4,148,355 | A | * | 4/1979 | Gehring ................ F24H 4/04 122/37 |
| 4,179,902 | A | | 12/1979 | Mueller et al. |
| 4,194,560 | A | * | 3/1980 | Matsuzaki ............. F01P 11/08 165/141 |
| 4,332,294 | A | * | 6/1982 | Drefahl ................. F28F 1/06 138/173 |
| 5,839,505 | A | * | 11/1998 | Ludwig ................ F28D 1/0477 138/38 |
| 5,950,716 | A | * | 9/1999 | Appelquist ........... F28D 7/106 165/109.1 |
| 9,091,487 | B2 | * | 7/2015 | Byon .................... F28D 7/106 |
| 2008/0128526 | A1 | * | 6/2008 | Otake ................... F24H 1/208 237/2 B |

FOREIGN PATENT DOCUMENTS

| | | | |
|---|---|---|---|
| EP | 1489366 A1 | 12/2004 | |
| FR | 2605718 A1 * | 4/1988 | ............ F24D 3/085 |
| RU | 2088872 C1 | 8/1997 | |
| WO | 9949268 A1 | 9/1999 | |

OTHER PUBLICATIONS

English Translation of the Written Opinion of the International Searching Authority issued in Corresponding PCT/BE2014/000011, dated Sep. 1, 2015 (7 pages).

International Search Report and Written Opinion in Corresponding PCT/BE2014/000011, dated Aug. 25, 2014 (9 pages).

English Translation of International Search Report in Corresponding PCT/BE2014/000011, dated Aug. 25, 2014 (2 pages).

Office Action from the Russian Patent Office in Related Application No. 2015137099/06 dated Jan. 10, 2018, in English (9 pages).

* cited by examiner

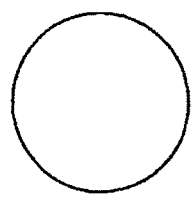 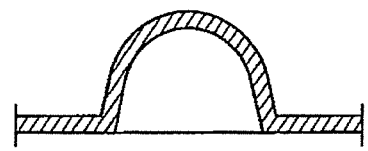
Fig.11A  Fig.10A
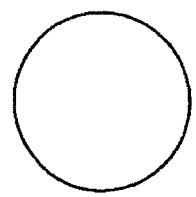 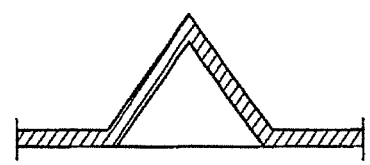
Fig.11B  Fig.10B
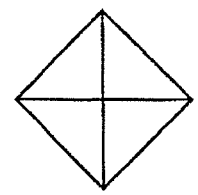 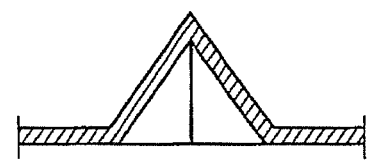
Fig.11C  Fig.10C
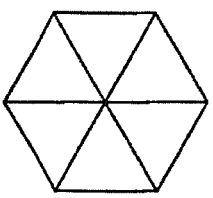 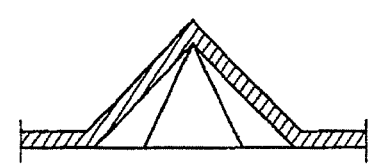
Fig.11D  Fig.10D
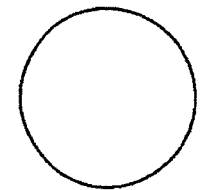 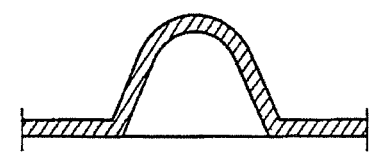
Fig.11E  Fig.10E

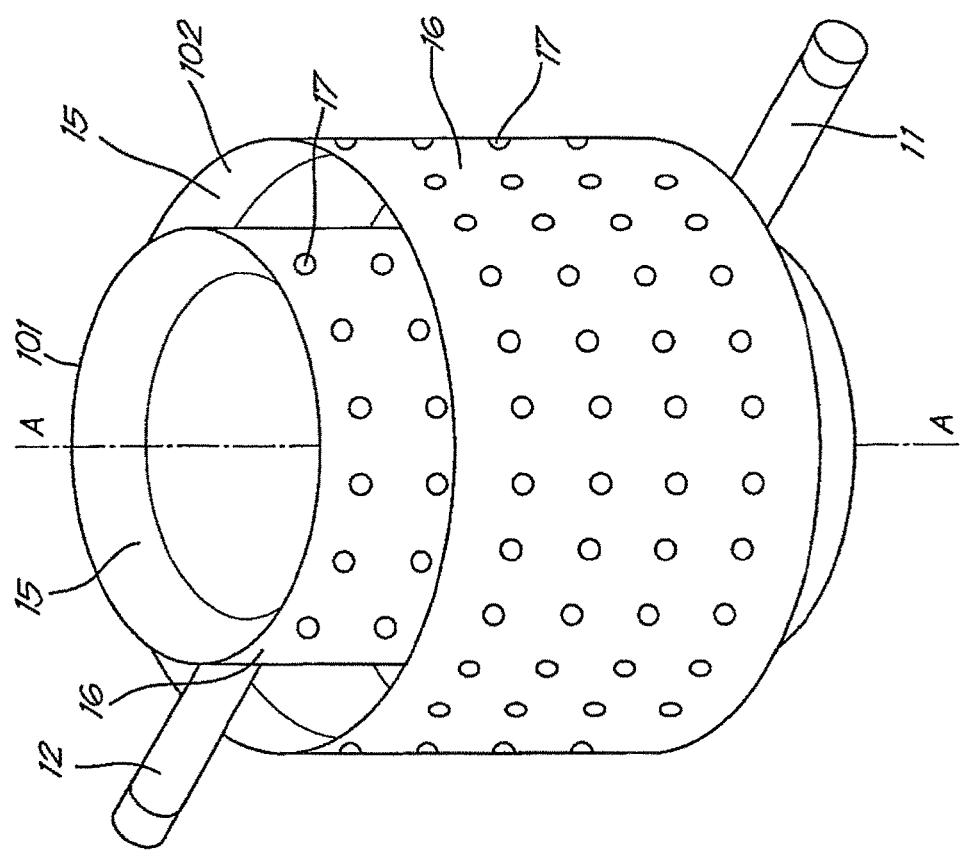

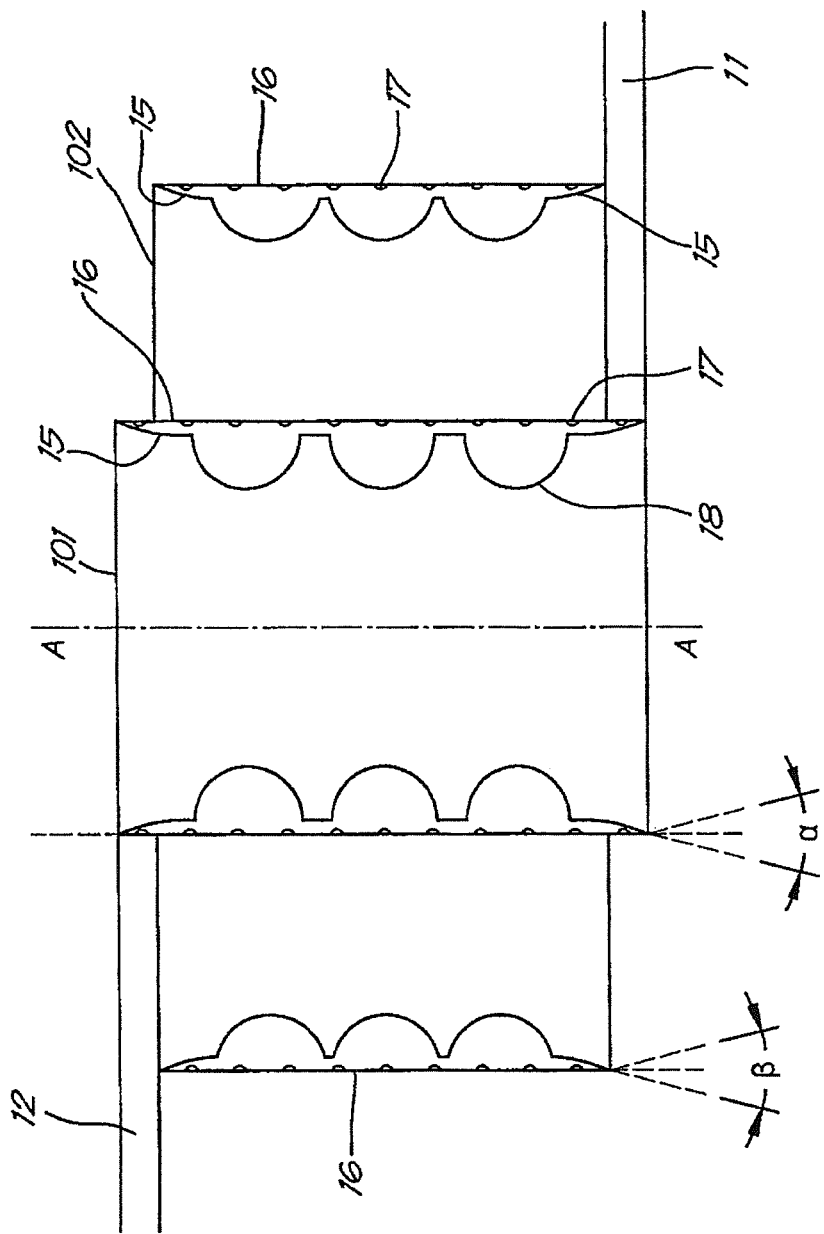

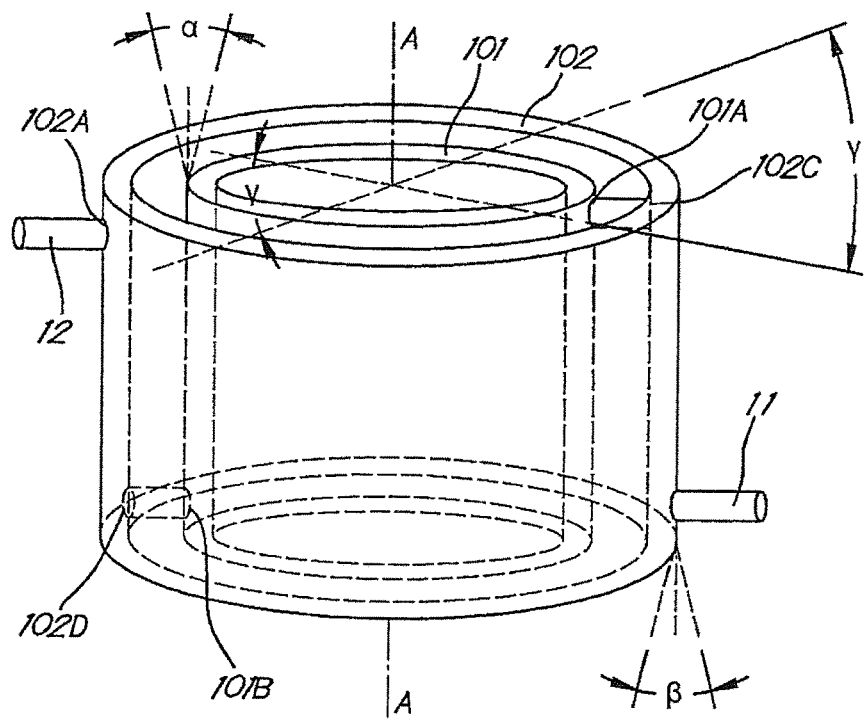
Fig.17
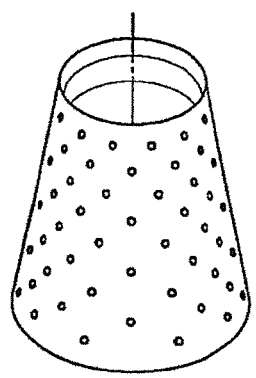
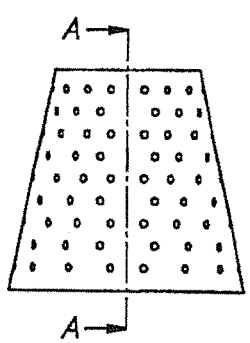
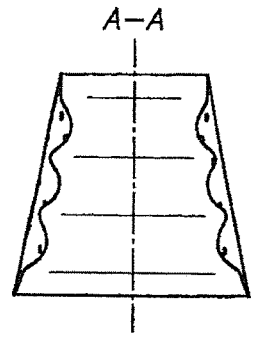
Fig.18　　Fig.19　　Fig.20

FACILITY FOR PRODUCING A HOT LIQUID, IN PARTICULAR HOT WATER

The present application is a continuation in part of PCT/BE2014/000011 filed on Feb. 28, 2014 and published on Sep. 4, 2014 under number WO2014/131093, said PCT application claiming the priority of European Patent Application EP13 001 034.1 filed Mar. 1, 2013.

SUBJECT OF THE PRESENT INVENTION

The object of this invention is a facility for producing a hot liquid, in particular hot water, comprising at least:
(a) a vessel suitable for resisting an internal pressure of more than $3\ 10^5$ Pa and intended to contain a material capable of storing heat, in particular a liquid under pressure, advantageously water for heating under pressure, this vessel comprising at least a heating system for a liquid under pressure, advantageously water, with an inlet suitable for conveying the liquid or water for heating and an outlet suitable for removing the hot liquid or hot water, and
(b) a primary exchanger extending into the vessel, this exchanger being suitable for a heat transfer fluid to circulate and comprising at least an inlet to convey the heat transfer fluid into the primary exchanger and an outlet to remove a heat transfer fluid.

PRIOR ART

Facilities of this type are known, in which the primary exchanger is in the form of a coil, in which a heat transfer fluid flows, coming from a burner for example. These facilities have the disadvantage of having a limited heat exchange output, problems with the coil blocking, considerable losses of load, etc. Moreover, for these facilities that are known limestone being deposited in or on the coil causes the heat exchange output to fall and causes the facility to be stopped in order to carry out a chemical and/or mechanical treatment in order to remove the limestone deposited. Such a chemical and/or mechanical treatment may cause problems with sealing and/or leakage, then making the exchanger unusable.

Facilities of the "tank in tank" type are also known, in which the primary exchanger is a vessel with a small volume situated in a vessel with a large volume.

A facility of this type is described in document EP1489366 for example. In this facility the water contained in the small vessel is heated by the water situated in the large vessel. The small vessels 14, 15 in FIG. 1 of EP1489366 are not suitable for allowing the water present in the large vessel to be heated with an output equal to that of a coil.

BRIEF DESCRIPTION OF THE INVENTION

This invention is aimed at a facility for producing a hot liquid and hot water contained in a vessel by means of an exchanger situated in the vessel, in which a heat transfer fluid circulates, this facility having an exchange output greater than that of a coil. The exchanger of the facility resists crushing for external pressures of more than $3\ 10^5$ Pa, advantageously more than $5\ 10^5$ Pa.

Therefore the object of the invention is a facility of the type described in the first paragraph of this report, this facility also being characterised in that at least a primary exchanger (10) is defined at least partly between a substantially cylindrical or tapering inner wall (16) with a minimum average internal diameter of 5 cm, in particular a minimum average diameter of 10 cm, advantageously a minimum average diameter of 20 cm, and a minimum height of 20 cm and a substantially cylindrical or tapering outer wall (15) with an average external diameter greater than the average internal diameter of the substantially cylindrical inner wall (16) and a minimum height of 20 cm, these inner and outer walls (15, 16) being at a distance from each other in order to form between them a chamber with a minimum height of 20 cm intended for the heat transfer fluid to flow,
in that the inner wall (16) and/or the outer wall (15) have an area having at least two circular ribs (18) separated from each other by an intermediate line or area and situated within a first substantially cylindrical area, and
in that the outer wall (15) and/or the inner wall (16) have a series of indentations (17) towards the inner wall (16) and towards wall (15) respectively, these indentations (17) being at a distance from each other and forming areas of support for the outer wall (15) on the inner wall (16) and the inner wall (16) on the outer wall (15) respectively in order to provide a minimum distance between the inner and outer walls (15, 16) at least for the intermediate line or area between the circular ribs (18) of the inner wall (16) and/or the outer wall (15).

Average internal diameter and average external diameter are understood to be the average diameter of the inner wall, which average is calculated along the height of the inner wall, and the average diameter of the outer wall, which average is calculated along the height of the outer wall, respectively. In the case of substantially cylindrical walls, the average internal diameter corresponds to the internal diameter of the cylinder formed by the inner wall, whereas the average external diameter corresponds to the external diameter of the cylinder formed by the outer wall. The cylinder formed by the inner wall is suitable for extending into the cylinder formed by the outer wall.

In the case of tapering walls, the average internal diameter and the average external diameter are determined for the part of the tapering inner wall and the tapering outer wall next to each other, the tapering inner wall being situated in the volume of the tapering outer wall. The average internal diameter is then the average of the diameters of the circular end sections of the part of the tapering inner wall next to the tapering outer wall. The average external diameter is then the average of the diameters of the circular end sections of the part of the tapering outer wall next to the tapering inner wall.

Advantageously the average distance between the inner (16) and outer (15) walls at the level of the area or line between the circular ribs (18), not taking the indentations (17) into account, is between 1 mm and 40 mm, advantageously between 1 mm and 20 mm, in particular between 1 mm and 10 mm, more advantageously between 1 mm and 7 mm, preferably between 2 and 5 mm, whereas the distance between the inner (16) and outer (15) walls at the level of the circular ribs has a maximum distance greater than this average distance by at least 5 mm at the level of the area or line between the circular ribs (18). The distance between these faces is measured in a direction perpendicular to the central axis of the inner wall. The average distance is an average of the distances per surface unit between the walls at the level of the area or line between the circular ribs, not taking the indentations into account. It is considered that the faces of the inner and outer walls are smooth at the level of the area or line between the circular ribs for the calculation of this average distance at the level of the area or line between the circular ribs.

Preferably the average distance between the inner (16) and outer (15) walls at the level of the central area of a wall having at least two circular ribs (18) varies between a minimum distance of between 1 mm and 5 mm, advantageously between 2 and 4 mm, and a maximum distance of between 8 mm and 60 mm, in particular between 10 mm and 50 mm, advantageously between 10 mm and 25 mm, preferably between 10 and 20 mm.

The vessel 1 may be used in a facility for recovering heat, heat coming from a source of green energy for example, solar energy or energy from the ground or energy recovered by means of a heat pump for example. In this case the vessel contains a material capable of storing heat and capable of restoring this heat to a liquid under pressure via a heating system, via a heat exchanger of the type described for the primary exchanger 10 for example. The material capable of storing heat is a material capable of changing state for example, capable of passing from a solid state to a liquid state, etc. for example. Examples of materials capable of storing heat are paraffins, greases, oils, aqueous compositions, compositions containing salts, sodium silicate, silica, etc. for example. The liquid under pressure heated in a facility comprising such a vessel 1 is suitable for heating applications (for example low temperature type, such as temperature between 35° C. and 90° C.) for floors, heating using heat pumps, etc. for example.

According to an advantageous detail of an embodiment, at least two ribs of a central area of a wall follow each other in such a way that, in a cross section in a plane passing through the central axis (AX) of the wall considered (16), each defines an undulation or wave, the peak or trough of which is rounded, the height or depth (h) of the peak or trough measured in a direction perpendicular to the central axis (AX) of the wall considered (16) in relation to the average level of these bottom ends being between 8 mm and 25 mm, whereas the distance (EC) between two successive peaks or two successive troughs is between 0.1 and 20 times the height (h) of the peak, advantageously between 1 and 15 times the height (h) of the peak, preferably between 2 and 10 times the height (h) of the peak, between 3 and 10 times the height of the peak for example, preferably 4 to 10 times the height of the peak, advantageously the pitch (P) of each wave or undulation being between 1 and 15 (preferably between 4 and 10) times the height or depth (h) of the wave considered.

Other special features and details of advantageous embodiments are mentioned in the following specification and are one or several or a combination of the following special features or details:

the facility comprises at least three circular ribs or mouldings (18), advantageously successive, in the central area (16B) of the wall considered (16), in particular the inner wall. This central area may have more than three ribs or mouldings, if the vessel is of considerable height for example. The number of ribs or mouldings is 4, 5, 6, 7 or 8 for example. The number of ribs or mouldings may be higher than 8, for example 10, 15, 20, 25, 30, etc. However, if the number of mouldings or ribs is considerable, they will be of a smaller size. Advantageously these ribs or mouldings are substantially parallel to each other. and/or in order to provide a minimum distance between the inner and outer walls, at least one of these walls (15, 16), advantageously at least the outer wall, has indentations (17), the depth of which is between 1 and 10 mm, advantageously between 2 and 8 mm. The indentations of one wall are directed towards the other wall. The inner wall and the outer wall may each be provided with indentations suitable either for the indentations of one wall to be supported on the indentations of the other wall or for the indentations of one wall to be supported on a portion of the other wall not provided with indentations. and/or in order to provide a minimum distance between the inner and outer walls, at least one of these walls (15, 16) has a series of lines (L1, L2) of indentations, each line of indentations extending substantially in a plane substantially perpendicular to the central axis (AX) of the wall considered, the planes of two successive lines of indentations being at a distance from each other by a distance of between 10 mm and 100 mm, advantageously between 20 mm and 80 mm, preferably between 30 mm et 70 mm. and/or the distance between two adjacent indentations is less than 100 mm, advantageously less than 80 mm, but preferably greater than 20 mm. The distance between two adjacent indentations situated along a curved line is measured taking the curvature of the line into account, therefore this distance corresponds to the distance measured between the indentations considered for the outer wall developed (in a plane). and/or the circular ribs (18) of a wall are situated in a central area situated between a first substantially cylindrical area (16A) and a second substantially cylindrical area (16B) of the wall considered (16). The first substantially cylindrical area (16A) of the wall considered, in particular the inner wall (16), is at a distance from the other wall, in particular the outer wall (15), by a distance of less than 5 mm, advantageously less than 3 mm, at least near the central area, in particular the portion of the wall making the connection between the first area and the central area. and/or the first area (16A) of the wall considered (the inner wall for example) together with the other wall (15) forms a distribution chamber (20) for heat transfer fluid in the chamber (22) situated between the central area (16B) of the wall considered, in particular the inner wall (16), and the other wall, in particular the outer wall (15). and/or the second substantially cylindrical area (16C) of the wall considered, in particular the inner wall (16), is at a distance from the other wall, in particular the outer wall, by a distance of less than 5 mm, advantageously less than 3 mm, at least near the central area (16B), in particular the portion of the wall making the connection between the second area and the central area. and/or the second area (16C) forms a collector (21), advantageously providing a flow of heat transfer fluid leaving the chamber (22) defined between the central part (16B) of the wall considered, in particular the inner wall, and the other wall, in particular the outer wall (15), distributed substantially evenly along the passage section situated between this chamber (22) and this collector (21). and/or the indentations (17) of the wall considered, in particular the outer wall (15), have an at least partly oblong or curved form in order to guide the flow of the heat transfer fluid. and/or the first area (16A) together with the outer wall (15) forms a distribution chamber (20) for heat transfer fluid in the chamber (22) situated between the central area (16B) of the inner wall (16) and the outer wall (15). and/or the second substantially cylindrical area (16C) of the inner wall (16) is at a distance from the outer wall by a distance of less than 5 mm, advantageously less than 3 mm, at least near the central area (16B). and/or the second area (160) forms a collector (21), advantageously providing a flow of heat transfer fluid leaving the chamber (22) defined between the central part (16B) of the inner wall and the outer wall (15), distributed substantially evenly along the passage section situated between this chamber (22) and this collector (21). and/or the indentations (17) of the wall considered, in particular the outer wall (15), have an at least partly oblong or curved form in order to guide the flow of the heat transfer fluid. and/or the inner wall and/or the outer wall have indentations in order to provide a minimum distance between these inner and outer walls, defining between them a chamber, in which a heat transfer fluid flows between an inlet and an outlet, and in that it has a first density of indentations in a first area of the chamber near the inlet and a second density of indentations in a second area of the chamber situated between the first area and the outlet, this first density being greater than this second density.

According to a particularly preferred embodiment the inner wall (16) comprises a central area (16B) having at least two circular ribs (18) separated from each other by an intermediate line or area and situated between a first substantially cylindrical area (16A) of the inner wall and a second substantially cylindrical area (16C) of the inner wall, whereas the outer wall (15) has a series of indentations (17) towards the inner wall (16), these indentations (17) at a distance from each other forming areas of support for the outer wall (15) on the inner wall in order to provide a minimum distance between the inner and outer walls.

Advantageously the outer wall is substantially cylindrical without having circular ribs.

The number of indentations of the inner wall and/or the outer wall may vary according to their size or the desired effect or their form or the size of the primary exchanger for example. The number of indentations per $m^2$ of wall surface or density in number may vary between 10 and 1000 or even more per $m^2$ for example. The number of indentations per $m^2$ or density in number per m2 is 25, 50, 100, 200, 300, 500 or 700 for example. This density may vary according to their positions in relation to the chamber situated between the walls for example.

The density of indentations 17 may also be expressed in % in the form of the indented surface of a wall in relation to the total surface, that is to say in the form of a surface density expressed in %. This surface density is from 0.5% to 25% for example or even more, 1, 2, 3, 5, 7, 10, 15 and 20% for example. This surface density may vary according to their positions in relation to the chamber situated between the walls for example.

Advantageously the facility according to the invention has a combination of such special features and details.

According to a possible embodiment the facility according to the invention comprises two or more than two primary exchangers (10, 101, 102) installed in parallel and/or in series, some installed in parallel and others installed in series for example.

The object of the invention is also a primary exchanger such as defined for a facility according to the invention.

The object of the invention is also the use of a facility according to the invention for producing a hot liquid, in particular hot water for central heating or for domestic sanitary use. In this use, a heat transfer fluid is conveyed into the space situated between the inner wall and the outer wall of the exchanger, the calories of the heat transfer fluid are then transferred to the water present in the vessel through the outer wall and through the inner wall at the same time. The flow of heat transfer fluid undergoes considerable changes in the chamber formed between the central wall of the inner wall and the outer wall, forming a turbulent flow in this way, advantageously with whirlpools forming in the chambers formed at the level of the circular ribs. Moreover, the indentations of the outer wall and/or the inner wall form fingers deflecting or guiding the flow of the heat transfer fluid.

Special features and details of preferred embodiments of the invention will appear from the following detailed description, in which reference is made to the enclosed drawings.

BRIEF DESCRIPTION OF THE DRAWINGS

In these drawings

FIGS. 10A to 10E are sectional views of examples of indentations, whereas FIGS. 11A to 11E are top views of the indentations, FIG. 13 is a perspective view of a particular exchanger, comprising two primary exchangers installed in parallel;

FIG. 14 is a sectional view of the exchanger in FIG. 13 along line XIII-XIII;

FIG. 17 is a perspective view of a particular exchanger, comprising two primary exchangers installed partly in parallel and in series FIGS. 18 to 20 are perspective, side and sectional views of a primary exchanger similar to that in FIG. 5.

DESCRIPTION OF PREFERRED EMBODIMENTS

Figure 1:
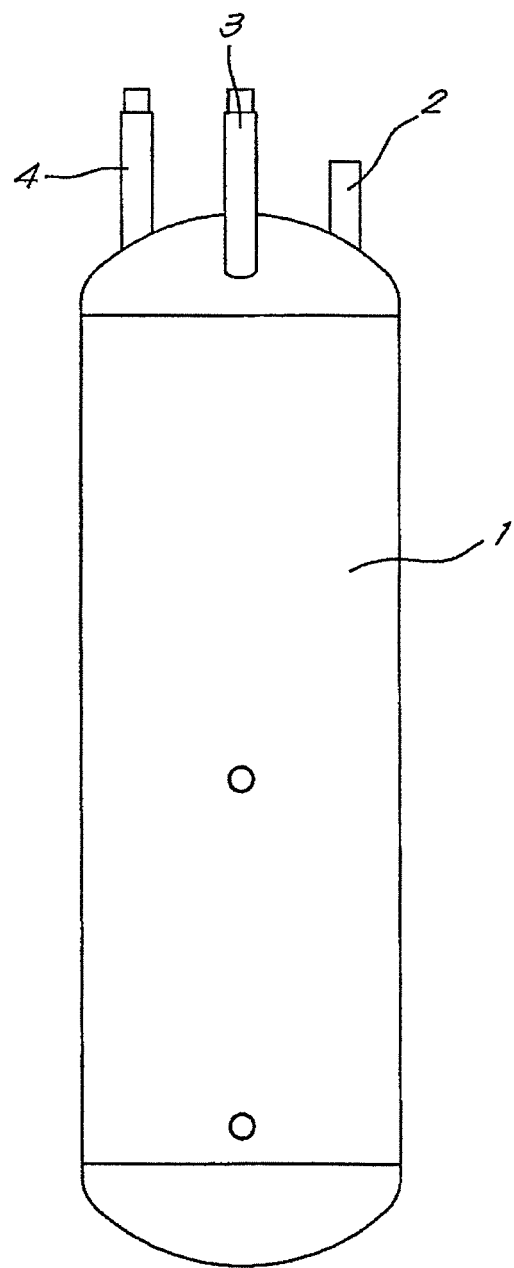
FIG. 1 is a front view of a facility according to the invention.
Figure 2:
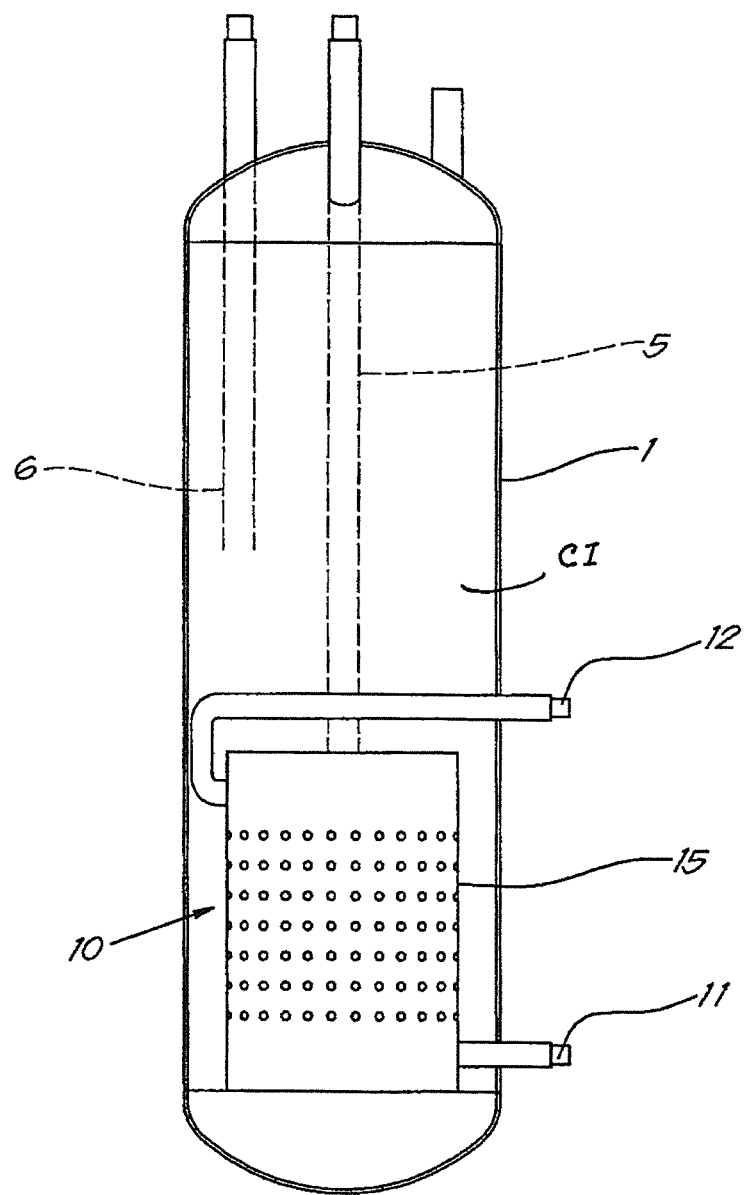
FIG. 2 is a sectional view of the facility in FIG. 1.

The object of this invention is a facility for producing hot water (for example having a temperature comprised between 60° C. and 100° C.), comprising (a) a vessel suitable for resisting an internal pressure of more than 3 $10^5$ Pa, in particular pressures of between 5 and 10 $10^5$ Pa, and intended to contain water for heating under pressure, hot sanitary water for example, this vessel 1 comprising at least an inlet 2 suitable for conveying the water for heating into the vessel and one or several outlets 3, 4 suitable for removing the hot water, these outlets 3, 4 being the end of pipes 5, 6 immersed in the chamber CI of the vessel 1, and (b) a primary exchanger 10 extending into the vessel 1, this exchanger 10 being suitable for a heat transfer fluid to circulate and comprising at least an inlet 11 to convey the heat transfer fluid into the primary exchanger 10 and an outlet 12 to remove heat transfer fluid. Advantageously this exchanger 10 is installed near the bottom end of the vessel 1, the heat transfer fluid entering in the bottom part of the exchanger and leaving through the top part of the exchanger. In the embodiments the primary exchanger 10 may be positioned at other places in the vessel, in the top part or in the middle for example.

Figure 3:
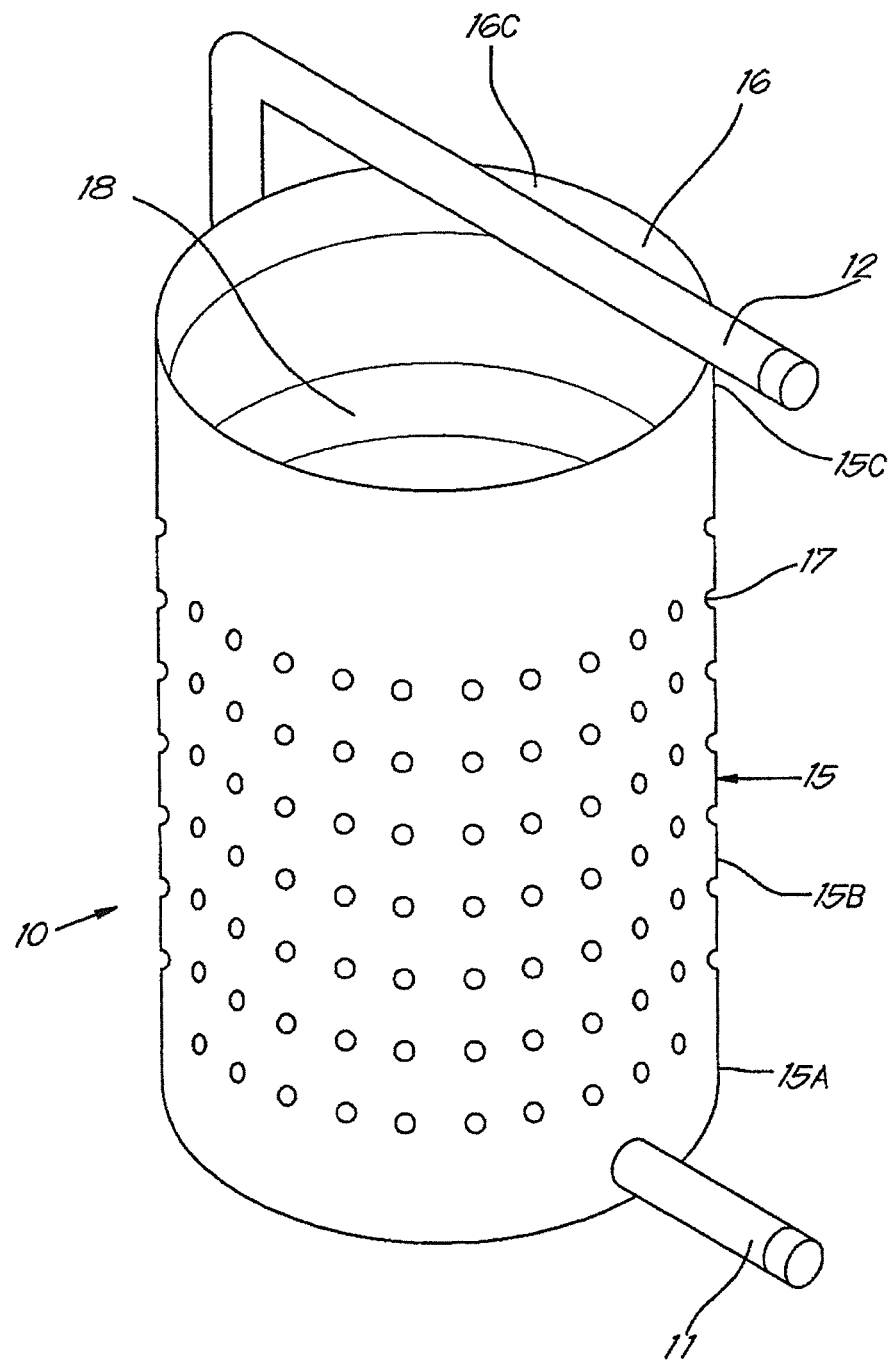
FIG. 3 is a perspective view of the primary exchanger.
Figure 4:
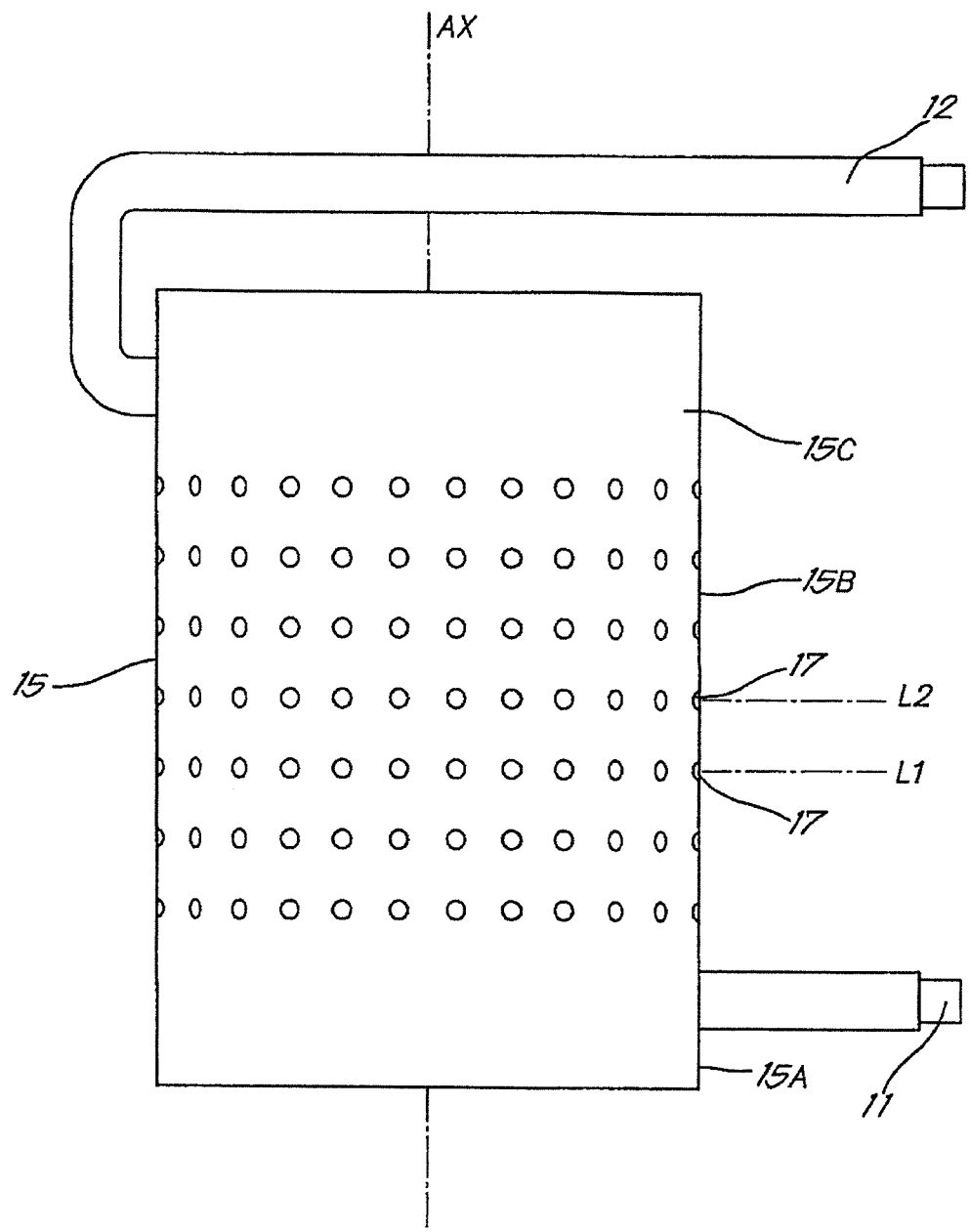
FIG. 4 is a front view of the primary exchanger.

The primary exchanger 10 shown in FIG. 3 is a particularly preferred exchanger. This exchanger is formed by two substantially cylindrical metal walls (advantageously in stainless steel) 15, 16 welded to each other along their edges. Wall 15 is the outer wall, whereas wall 16 is the inner wall extending into the volume defined by wall 15. The external face of the inner wall and the internal face of the outer wall are turned towards each other, but at a distance from each other, in order to form between them one or more chambers, in which the heat transfer fluid may circulate. The outer wall 15 has a series of indentations 17 directed towards the inner wall 16. These indentations 17 form protrusions or protuberances intended to provide a minimum distance between the two walls. This minimum distance is obtained when the free end of a protrusion or protuberance 17 hits the external face of the inner wall 16 (face turned towards the internal face of the outer wall 15).

The primary exchanger 10 comprises:
- a distribution chamber 20 for the heat transfer fluid, receiving the heat transfer fluid through the inlet 11, this distribution chamber 20 being defined between a substantially circular area 16A of the inner wall 16 and a substantially cylindrical area 15A of the outer wall 15, this area 15A having some protrusions, advantageously this distribution chamber is near the bottom end of the vessel 1;
- a collection chamber 21 for the heat transfer fluid in order to convey it to the outlet 12, this collection chamber being defined between a substantially cylindrical area 15C of wall 15 and a substantially cylindrical area 16C of the inner wall 16, this collection chamber 21 being situated at a level above the level of the distribution chamber 20;
- an intermediate chamber 22 situated between the distribution chamber 20 and the collection chamber 21, this intermediate chamber 22 being defined between an area 15B of the outer wall 15 and an area 16B of the inner wall 16.

Advantageously the exchanger has a central axis of symmetry AX for the inner and outer walls (at least not taking the indentations 17 into account).

Area 15B of the outer wall is substantially cylindrical and has a diameter substantially equal to the diameter of areas 15A and 15C.

Area 16B has several circular ribs 18 (three in the embodiment, but it is clear that there could be more than three of them), each rib extending between two adjacent circular lines of the outer wall and having a curved area between these lines, the minimum diameter Dmin of which is less than the diameter of area 16A and area 16C of the inner wall 16.

These ribs allow areas of the inner wall to be created more at a distance in relation to the outer wall. In fact the distance between the external face of the inner wall 16 and the internal face of the outer wall varies between a minimum distance of about 3 to 5 mm in the area between two successive ribs 18 and at the level of the connection of area 15B with area 15A and area 15C of the inner wall 15 and a maximum distance of 10 to 20 mm. The minimum distance corresponds substantially to the height or depth of an indentation.

The ribs form successive waves or undulations, which in the embodiment are substantially identical to each other. These waves or undulations each have a peak S at a distance from the outer wall 15 by a distance of between 10 to 20 mm (maximum distance). The peaks of two successive waves or undulations are at a distance from each other by a distance of between 4 and 6 times the maximum distance or the height of the peak (or the average height of the peaks of two successive waves or undulations, if the waves or undulations have peaks situated at different distances in relation to the internal face of the outer wall 15).

Advantageously the indentations 17 extend along successive lines L1, L2, etc, each line extending in a plane substantially perpendicular to the central axis AX of the walls 15, 16, the planes of two adjacent lines being at a distance from each other by a distance of between 30 and 70 mm. Although the indentations 17 of different lines may extend along a line parallel to the axis AX, the indentations 17 of adjacent lines may very well not extend along a line parallel to the axis AX. Advantageously circular lines, along which the indentations extend, are arranged in order for the indentations to be able to be supported on the external face of the inner wall 16 along the circular lines defined between two adjacent ribs as well as at the level of the lines connecting the end ribs with areas 16A and 160 of the inner wall.

Figure 6:
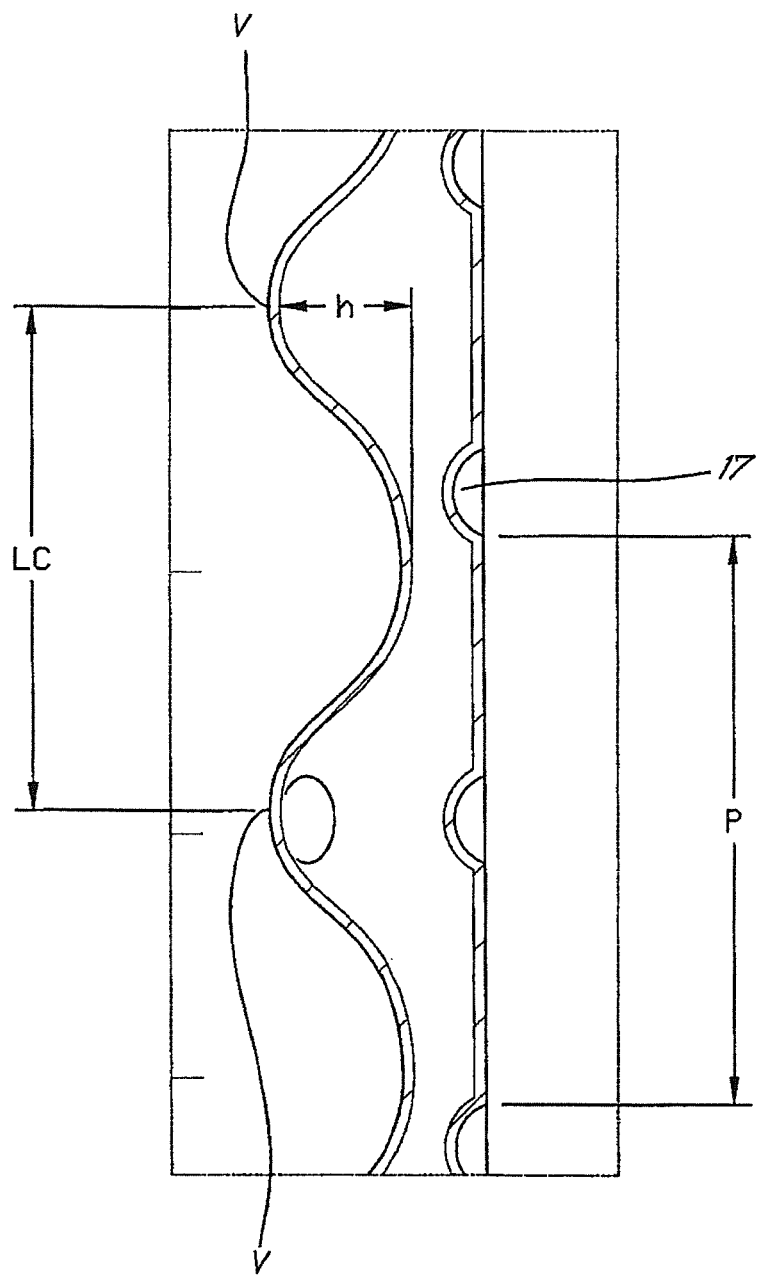
FIG. 6 is a detailed view of the portion of the primary exchanger indicated by B in FIG. 5, FIGS. 7A, 7B and 7C are spread out views of an outer wall provided with another type of indentation, that is to say oblong indentations, for a facility according to FIG. 1, FIGS. 8A and 8B are views similar to that in FIG. 4, but for a primary exchanger with different densities of indentations in the outer wall.

In the embodiment in FIG. 6 the indentations have a form defining a substantially spherical trough or a substantially spherical protuberance, the diameter of the trough measured along the external face of the outer wall being between 2 and 10 mm for example. Two ribs 18 follow each other in such a way that, in a cross section in a plane passing through the central axis (AX) of the inner wall (16), each defines two waves V, the peak of which is rounded, each wave extending between the bottom ends of two ribs following each other, the height (h) of the peak measured in a direction perpendicular to the central axis (AX) of the inner wall (16) in relation to the average level of these bottom ends being between 8 mm and 25 mm, whereas the distance (EC) between these peaks is between 2 and 10 times the height (h) of the peak, advantageously between 3 and 8 times the height of the peak, preferably 4 to 6 times the height of the peak, advantageously the pitch (P) of each wave being between 2 and 6 times the height (h) of the wave considered. The distance EC is equal to the pitch P for two waves following each other without intermediate area.

Figure 7A:
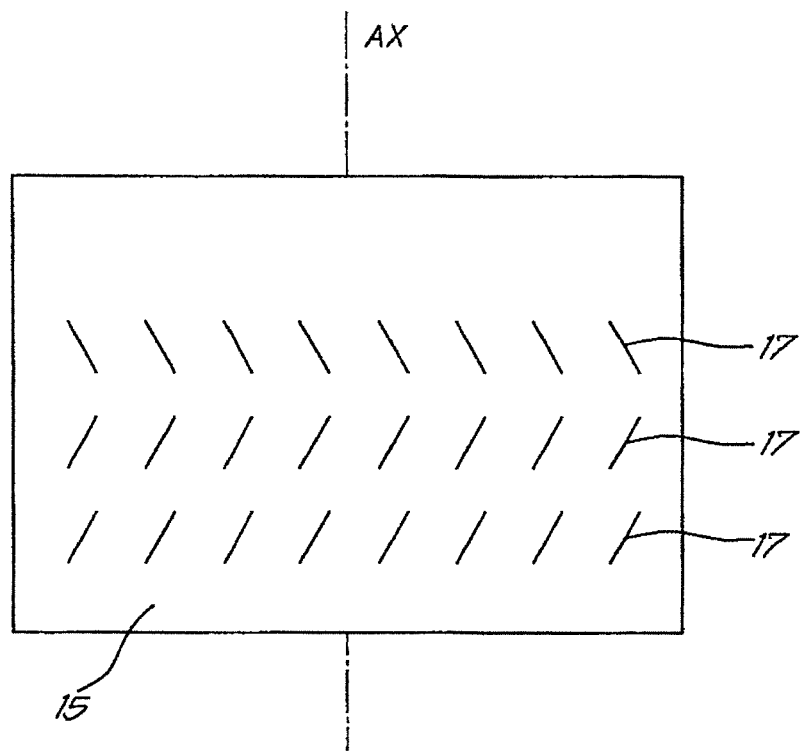

FIG. 7A shows the plate 15 before bending intended to be used for making the external envelope of a primary exchanger 10 for a facility similar to that in FIG. 1, this plate 15 differing only in the form of the indentations 17, the indentations having an oblong form not parallel to the axis AX of the walls 15, 16, in such a way that they direct the heat transfer fluid or at least a part of it in a direction not parallel to the axis AX. This allows the turbulence of the flow of the heat transfer fluid in the chambers formed between the ribs and the outer wall 15 to be improved even more.

Figure 7B:
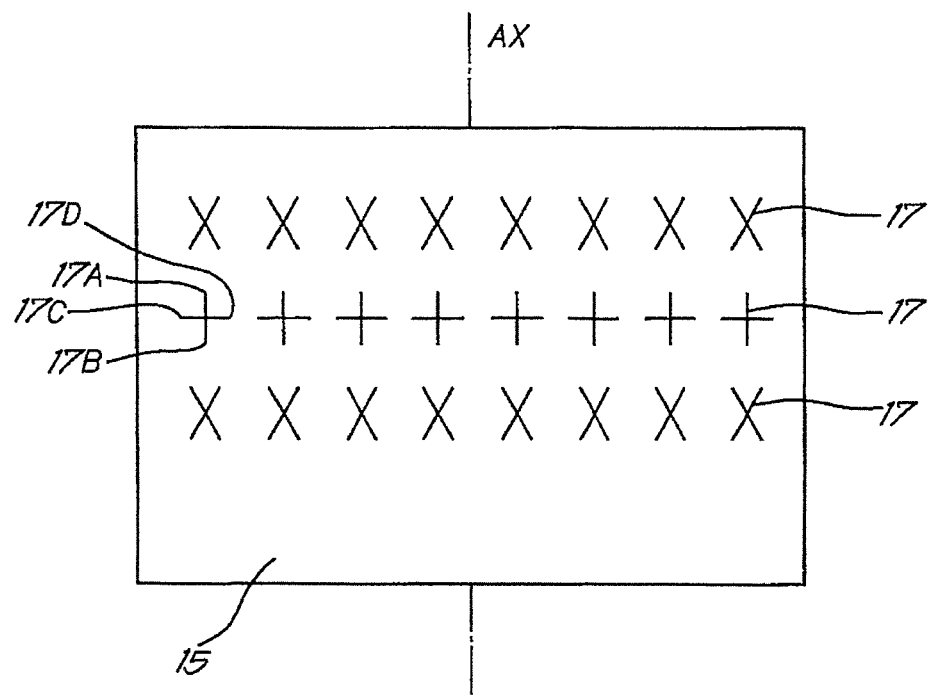

In FIG. 7B, the indentations 17 have the form of a cross with four branches 17A, 17B, 170, 17D, sometimes arranged so that two branches are substantially parallel to the axis AX, sometimes arranged so that all the branches form an angle (between 15° and 75° for example) with this axis AX.

Figure 7C:
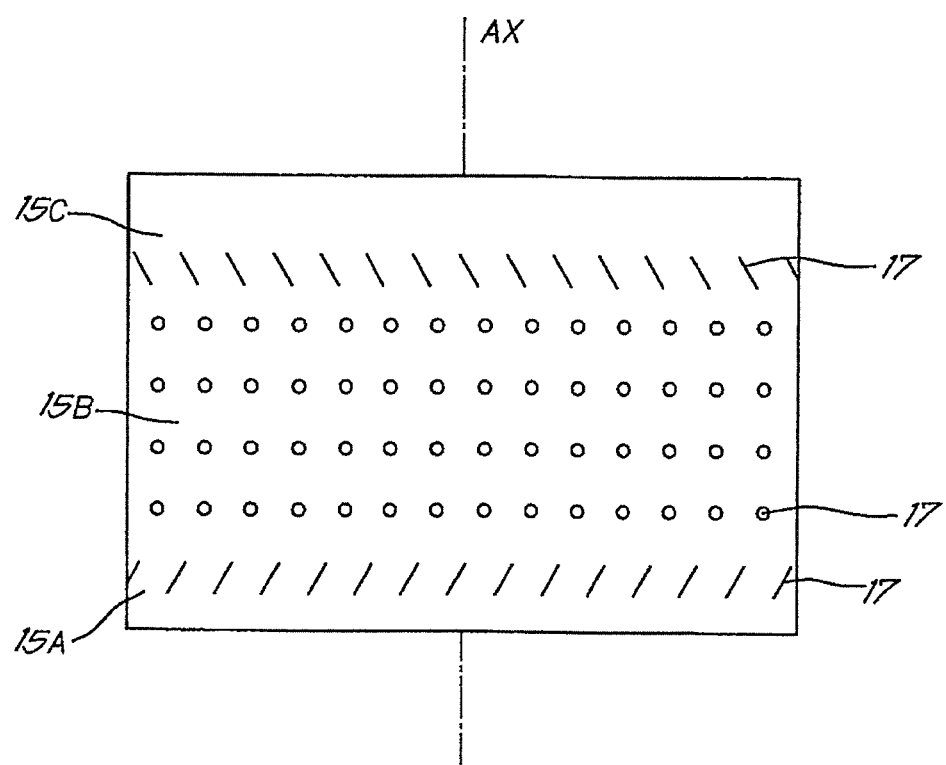

In FIG. 7C, the wall 15 has different lines of indentations 17, a line of oblong indentations sloping in relation to the axis AX in the area 15A near the inlet for the heat transfer fluid for example, this is in order to provide a substantially helicoidal movement of the heat transfer fluid in the distribution chamber 20, lines of indentations in the form of points in area 15B in order to provide turbulence in the chamber 22 formed between the circular ribs of the inner wall and the outer wall and lines of oblong indentations sloping in relation to the axis AX in the collection chamber in order to increase the path of the heat transfer fluid in the chamber 21.

Figure 5:
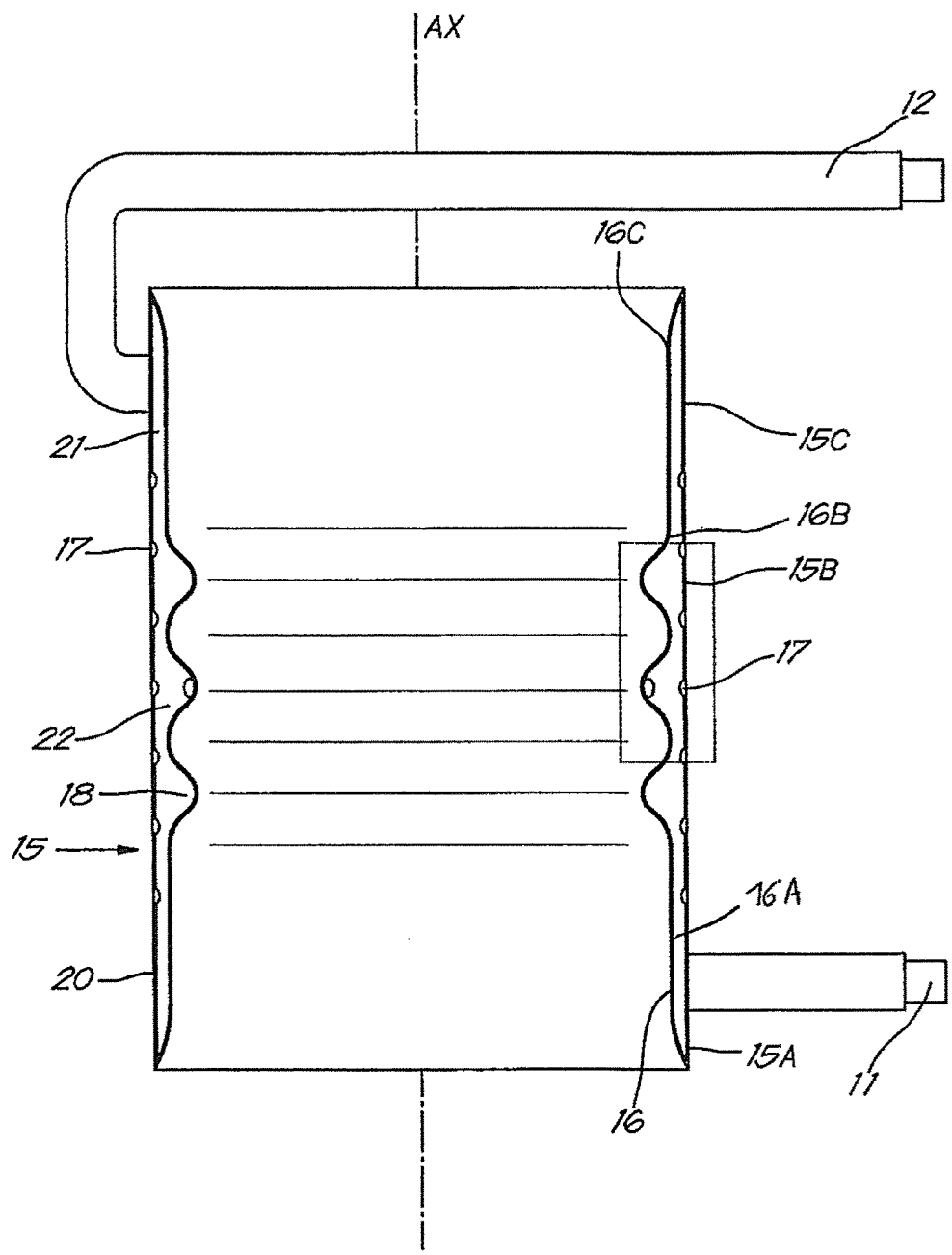
FIG. 5 is a sectional view of the primary exchanger along line A-A.
Figure 8A:
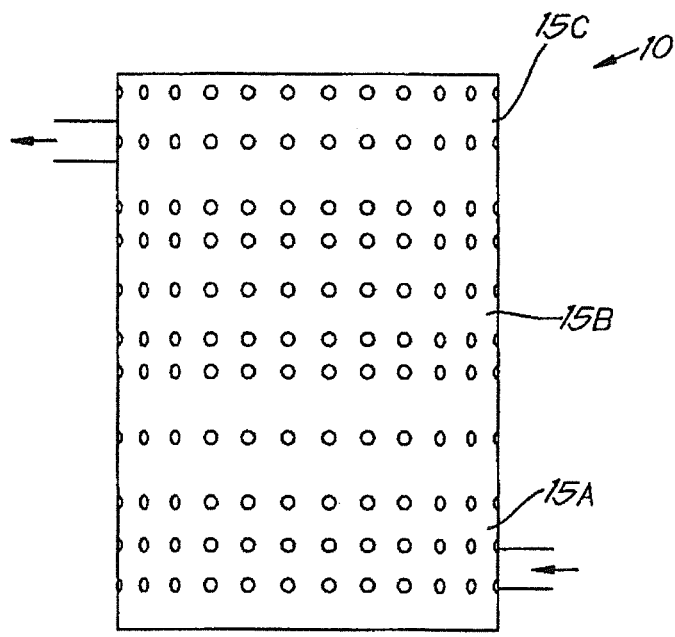
Figure 8B:
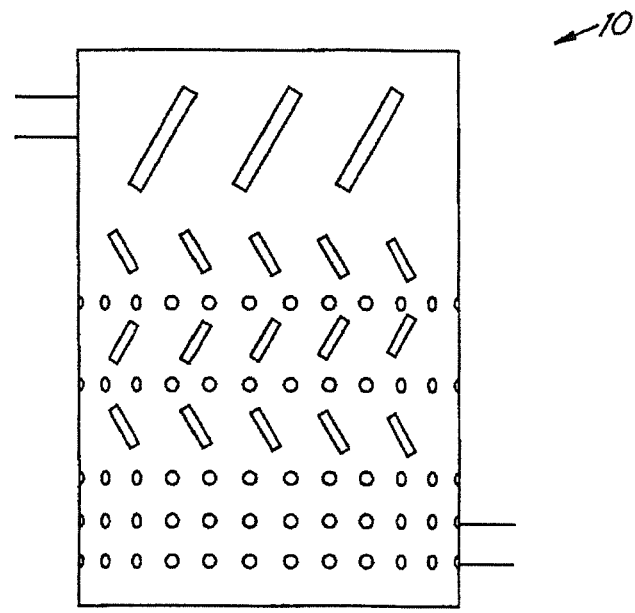

FIGS. 8A and 8B show exchangers similar to that in FIG. 5.

In the embodiment in FIG. 8A, the density of indentations or number of indentations per $m^2$ (d 1) is considerable in area 15A of the wall 15 and in the areas of the wall 15 adjacent to the areas (15D) making the connection between two successive ribs 18. The number of indentations 17 per $m^2$ or density at the level of the ribs (d 2) is lower than the density d 1. The number of indentations 17 per $m^2$ or density d 3 at the level of area 15C is lower than the density d 1 and advantageously lower than the density d 2.

In the embodiment in FIG. 8B the density of the indentations and their forms vary according to the areas of the wall 15.

Figure 9:
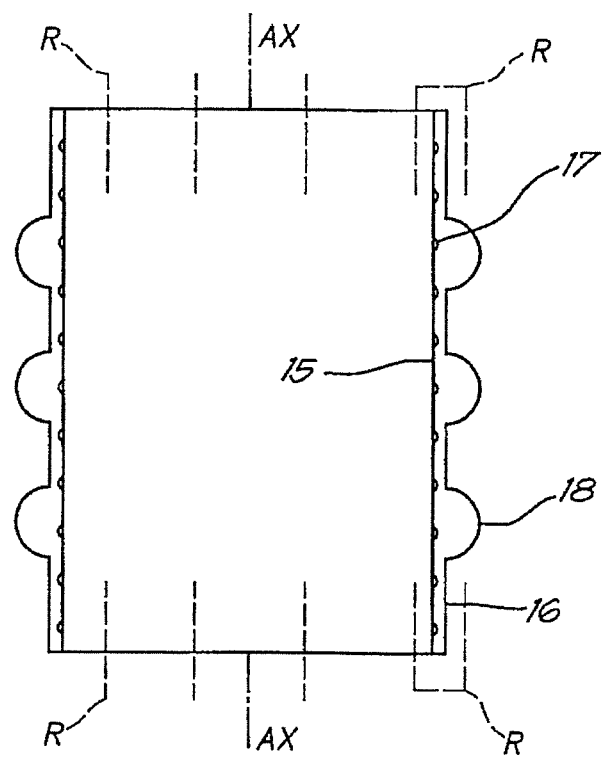
FIG. 9 is a view of a primary exchanger similar to that in FIG. 5, but for an exchanger, the outer wall of which is provided with external ribs, the inner wall and/or the outer wall being provided with indentations.

FIG. 9 is a view of a primary exchanger similar to that in FIG. 5, apart from the fact that the ribs are situated along the outer wall 16 and indentations 17 are present along the outer wall 16 and the inner wall 15 at the same time.

Advantageously reinforcing elements R are used in order to limit the movement of the walls in relation to each other.

Figure 12:
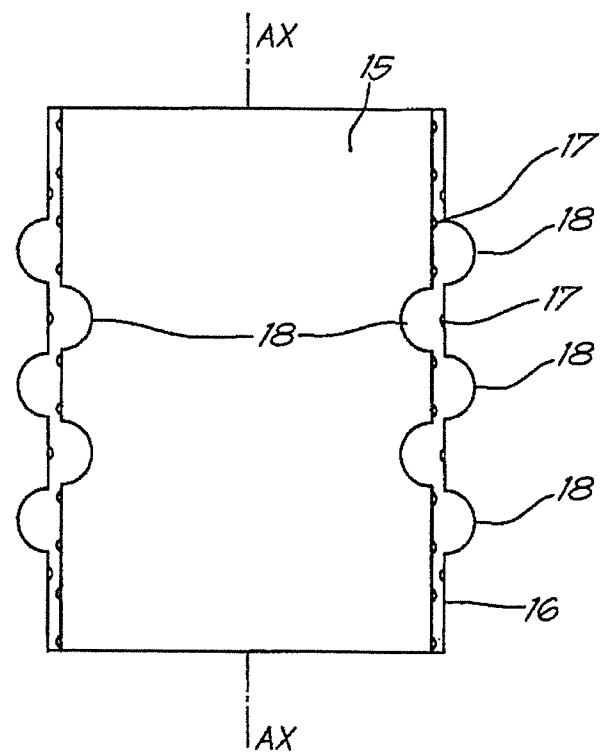
FIG. 12 is a view of a primary exchanger similar to that in FIGS. 5 and 9.

FIG. 12 is a view similar to that in FIGS. 5 and 9, the exchanger having ribs 18 and indentations 17 at the same time along the inner wall 16 and along the outer wall 15 at the same time. In the embodiment shown a circular rib of one wall is situated next to a cylindrical area of the other wall with or without indentations, but preferably with indentations 17. FIGS. 10 A-E and 11 A-E are views of examples of indentations given only as example.

The indentation 17 in FIGS. 10A and 11A is substantially hemispherical or in the form of a substantially hemispherical portion. The indentation 17 in FIGS. 10B and 11B is substantially conical or truncated cone. The indentation 17 in FIGS. 100 and 11C is in the form of a tetrahedron, in particular a substantially pyramid. The indentation 17 in FIGS. 10D and 11D is in the form of a polyhedron, with 6 faces for example. The indentation 17 in FIGS. 10E and 11E has the shape of a truncated cone, the tip point of which is rounded.

FIG. 13 is a perspective view of an exchanger according to the invention, comprising several primary exchangers 101, 102 (two in this case) installed in parallel.

The primary exchangers 101, 102 are primary exchangers of the type shown in FIGS. 1 to 6 for example. Each primary exchanger comprises a substantially cylindrical or tapering outer wall 15 and a substantially cylindrical or tapering inner wall 16, the outer wall having a series of indentations 17, whereas the inner wall has a series of circular ribs 18. A chamber for the heat transfer fluid to flow is defined between these inner and outer walls of each primary exchanger. In the case in FIG. 13, primary exchanger 101 is situated in the space defined by primary exchanger 102. Advantageously the internal primary exchanger 101 is longer than the external primary exchanger 102 for example.

The distance (measured between the closest points of the primary exchangers 101, 102) between the exchangers 101, 102 may vary, but is between 2 cm and 30 cm for example, advantageously between 2 cm and 10 cm. In this advantageous embodiment the circular ribs 17 of the primary exchangers are situated along the inner wall of each exchanger.

The central axis A-A of the internal primary exchanger 101 corresponds to the central axis of the external primary exchanger 102. The primary exchangers 101, 102 could not be coaxial.

In the embodiment in FIG. 13, the primary exchangers 101, 102 are installed in parallel. The conduit conveying the heat transfer fluid 11 conveys the liquid into a bottom part of primary exchanger 102 as well as to a bottom part of exchanger 101. After passing into the primary exchangers the heat transfer fluid passes into the conduit 12 connected to a top part of each exchanger 101, 102. It is obvious that other systems providing for the exchangers to be put in parallel are possible.

One or more primary exchangers 101, 102 could be of the tapering type, with a slope a, ß in relation to a straight line parallel to the axis A-A of between −60° and 60° for example, instead of being substantially cylindrical. Advantageously the slope of the exchangers is substantially equal in such a way that it keeps a substantially constant distance between the primary exchangers.

Figure 15:
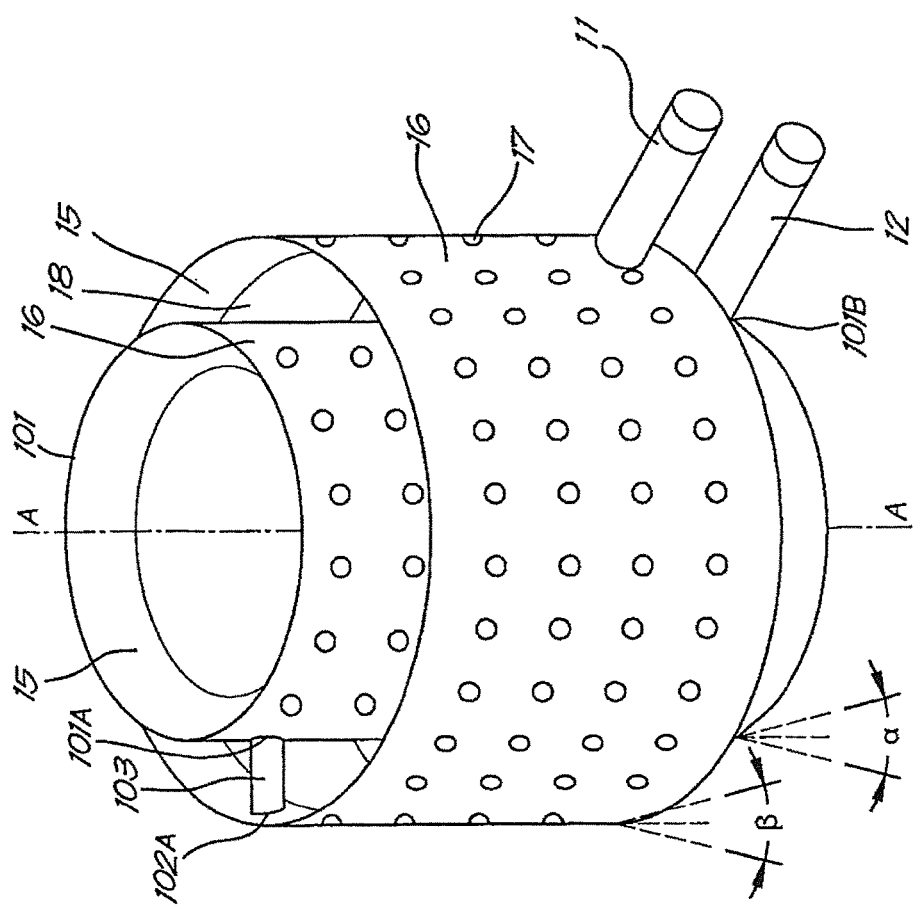
FIG. 15 is a perspective view of a particular exchanger, comprising two primary exchangers installed in series.
Figure 16:
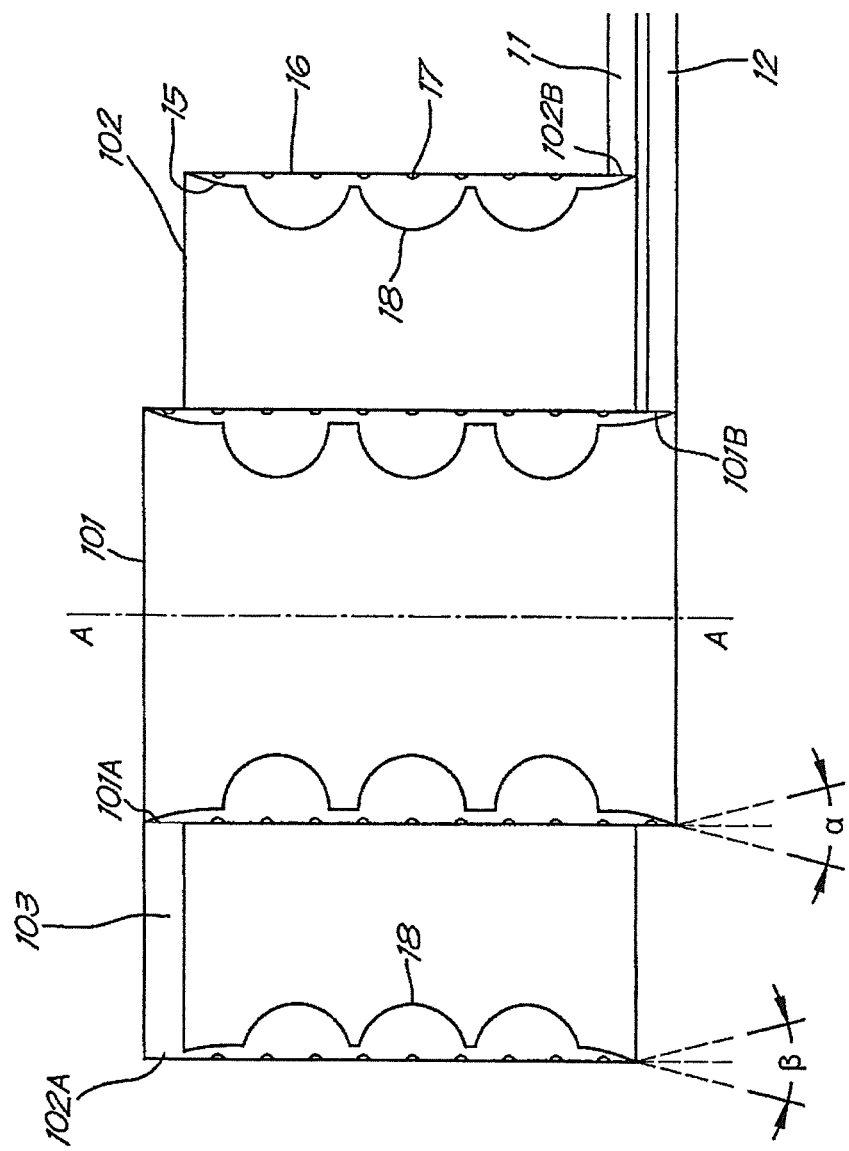
FIG. 16 is a sectional view of the particular exchanger, comprising two primary exchangers installed in parallel.

The exchanger in FIG. 15 comprises two primary exchangers 101, 102 similar to those in FIG. 13. In the embodiment, the primary exchanger 102 is supplied with heat transfer fluid near one of its ends (in this case end 102B turned towards the bottom) through conduit 11. The heat transfer fluid leaves primary exchanger 102 at the level of its other end (in this case the opening or passage 102A diametrically opposite in relation to passage 102B and turned towards the top) through conduit 103, the heat transfer fluid then being conveyed through this conduit 103 to an end 101A of primary exchanger 101 (in this case the end adjacent to the outlet of primary exchanger 102 for the heat transfer fluid). The heat transfer fluid leaves primary exchanger 101 near its other end 101E (in this case opening 101E diametrically opposite opening or passage 101A and turned towards the bottom) through conduit 12. The conduits 11 and 12 are then close to each other. In this embodiment the primary exchangers are installed in series.

One or more primary exchangers 101, 102 could be of the tapering type, with a slope a, ß in relation to a straight line parallel to the axis A-A of between −60° and 60° for example, instead of being substantially cylindrical. Advantageously the slope of the exchangers is substantially equal in such a way that it keeps a substantially constant distance between the primary exchangers.

The exchanger in FIG. 17 is an exchanger similar to those in FIGS. 13 and 15, but the primary exchangers 101, 102 operate partly in parallel and partly in series. Here also the primary exchangers could be substantially tapering instead of being substantially cylindrical.

In this embodiment, the conduit 11 conveys the heat transfer fluid to an end of the external primary exchanger 102 (end 102B turned towards the bottom), whereas the heat transfer fluid leaves primary exchanger 102 at another end 102A (the passage 102A diametrically opposite in relation to passage 102B and turned towards the top).

The internal primary exchanger 101 is supplied with heat transfer fluid through opening 101A situated at an end of primary exchanger 101 at a distance from end 102B. Opening 101A is connected to the outlet 102C of the external primary exchanger 102 through conduit 105. The outlet 102C is situated substantially in the area of exchanger 102 parallel to the axis A-A and comprises passage 102B, a curved area extending over an angular section γ of less than 30°. The heat transfer fluid leaves the internal primary exchanger 101 through the passage 101B diametrically opposite passage 101A and situated near the end of exchanger 101 opposite that where passage 101A is situated. The heat transfer fluid leaving the internal primary exchanger 101 through passage 101E is conveyed to the external primary exchanger 102 via passage 102D through conduit 106.

Passage 102D is situated substantially in the area of exchanger 102 parallel to the axis A-A and comprises passage 102A, a curved area extending over an angular section γ of less than 30°.

It is obvious that the primary exchangers 101, 102 may comprise one or more internal deflectors in order to control the amount of heat transfer fluid going through the internal primary exchanger 101 in relation to the total amount of heat transfer fluid flowing between conduit 11 and conduit 12.

Figure 21:
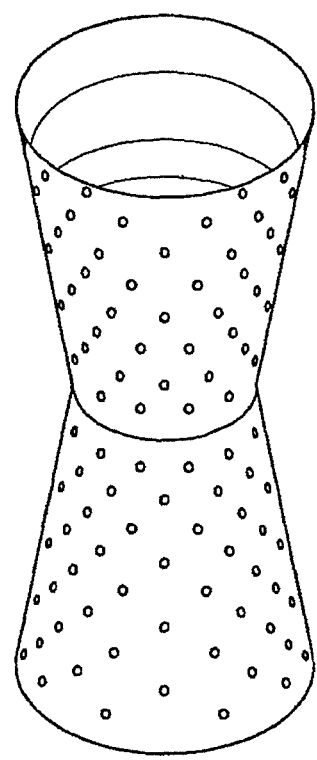
FIGS. 21 to 23 are perspective, side and sectional views of still another primary exchanger similar to that in FIG. 5.
Figure 22:
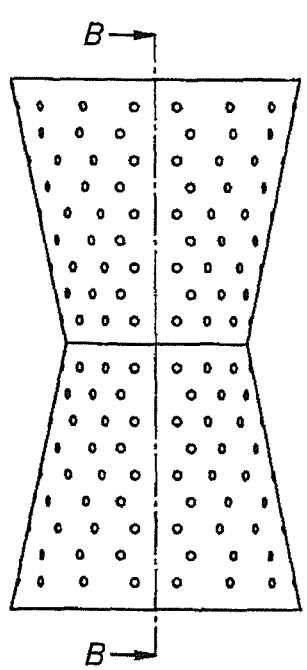
Figure 23:
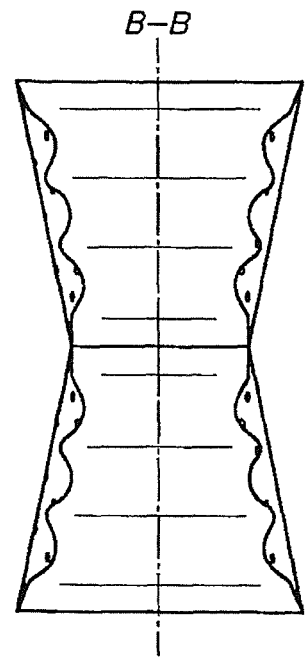

It is also obvious that the exchangers could be substantially tapering or even in the form of a hyperbola instead of being substantially cylindrical. FIGS. 18 to 20 show a primary exchanger body having a substantially conical general form, whereas FIGS. 21 to 23 show an exchanger body substantially in the form of a hyperbola or combining two substantially conical primary exchangers.

Advantageously in the preferred embodiments the primary exchanger or primary exchangers is/are substantially cylindrical.

Tests on the use of the facility according to FIGS. 1 to 6 for producing hot water for central heating or for domestic sanitary use showed that it was possible to obtain a better heat exchange output than with a coil having the same exchange surface and made of the same stainless steel as the exchanger according to the invention. In the facility according to the invention, a heat transfer fluid is conveyed into the space situated between the inner wall and the outer wall of the exchanger, the calories of the heat transfer fluid are then transferred to the water present in the vessel through the outer wall and through the inner wall at the same time. The flow of heat transfer fluid undergoes considerable changes in the chamber formed between the central wall (with the ribs) of the inner wall and the outer wall, forming a turbulent flow in this way, advantageously with whirlpools forming in the formed chambers at the level of the circular ribs. Moreover, the indentations of the outer wall form fingers deflecting the flow of the heat transfer fluid. It was noted that such a facility allowed the limestone deposited on both the inner and outer walls to be removed and therefore allowed a good heat exchange output to be provided over time. It was also noted that the water was heated quickly by the primary exchanger and that a large part of the calories of the heat transfer fluid succeeded in being transferred to the water.

These tests on the use of the facility according to the invention (shown in FIGS. 1 to 6) showed the following advantages in relation to facilities using a heating coil or heating tube assembly:

less pressure loss for the heat transfer fluid passing. This reduced pressure loss was observed even after more than 6 months of continuous use of the facility.

the facility according to the invention allowed better heat transfer with the same pressure of the circulation pump.

the pump consumed less power for the same heat transfer.

in the facility according to the invention it was possible to provide a difference in temperature between the inlet and the outlet of less than 5° C., about 3° C. for example, which was impossible in reference facilities with the same heat transfer. This small difference in temperature between the inlet and the outlet for the facility according to the invention improves the heat transfer still more and also allows it to be controlled better.

It is possible to reduce the exchange surface in the facility according to the invention significantly in order to provide transfer of the same amount of heat. Therefore the facility according to the invention may have smaller dimensions in relation to an existing facility, whilst allowing the same heat transfer performance.

Better use of the water heated by a facility according to the invention in relation to a facility not according to the invention, The facility may have a very compact form with identical power, allowing it to be installed in small spaces or in spaces and rooms where the cost is considerable, strong room, shelters, clean rooms, rooms for computers or rooms for biological/microbiological units for example. This compactness of the facility according to the invention will also mean less use of material, lower weight and therefore ease of installation in relation to a facility not according to the invention with the same power, less limestone deposit forming in and on the primary exchanger (10) of the facility according to the invention. It seems that this reduced limestone deposit is due to deformations or relative movements of the walls in relation to each other. This reduced formation of limestone deposit provides better heat exchange even after a long period of time.

The facility in FIG. 1 could also be used in order to recover the calories coming from a source of green energy, a solar panel for example. Then the liquid contained in the vessel 1 may be used for central heating for a home, via the floor for example. In the case of the vessel containing a material intended to store the calorific energy, advantageously then the vessel 1 is associated with another exchanger, of the exchanger 10 type for example, in order to heat a liquid, in particular water.

We claim:

1. A facility for heating a first liquid for producing a hot first liquid, said facility comprising at least:
    (a) a vessel (1) suitable for resisting an internal pressure of more than $3\ 10^5$ Pa and defining a vessel chamber intended to contain, under a pressure of more than $3\ 10^5$ Pa, said first liquid to be heated, this vessel (1) comprising: (i) an inlet (2) suitable for conveying the first liquid into the vessel chamber, and (ii) at least an outlet (3, 4) suitable for removing the hot first liquid, said vessel having an inner face intended to contact said first liquid to be heated, and
    (b) a primary exchanger (10) extending into the vessel chamber of the vessel (1), this exchanger (10) being suitable for a heat transfer fluid to circulate and comprising at least an inlet (11) to convey the heat transfer fluid into the primary exchanger and an outlet (12) to remove a heat transfer fluid after flowing through the primary exchanger (10), in which the primary exchanger (10) extending into the chamber of the vessel (1) is defined at least partly between (i) an inner wall (16) selected from a cylindrical inner wall and a tapering inner wall, said inner wall (16) having a minimum average internal diameter of 5 cm and a minimum height of 20 cm, and (ii) an outer wall (15) selected from a cylindrical outer wall and a tapering outer wall, said outer wall (15) having an average external diameter greater than the average internal diameter of the inner wall (16) and a minimum height of 20 cm, said outer wall of the primary exchanger being distant from the inner face of the vessel, these inner and outer walls (15, 16) being at a distance from each other in order to form between them a heating chamber with a minimum height of 20 cm intended for the heat transfer fluid to flow, in which at least one wall selected from the group consisting of the inner wall (16) and the outer wall (15) has an area having at least two successive circular ribs (18) separated from each other by an intermediate zone selected from an intermediate line and an intermediate area, and in which a first wall selected from the group consisting of the outer wall (15) and the inner wall (16) has a series of indentations (17) towards the other wall selected from the group consisting of the inner wall (16) and the outer wall (15), these indentations (17) being at a distance from each other and forming areas of support for said first wall selected from the group consisting of the outer wall (15) and the inner wall (16), on the other wall selected from the group consisting of the inner wall (16) and the outer wall (15) in order to provide a minimum distance between the inner wall (16) and the outer wall (15) at least for the intermediate zone separating two of the successive circular ribs (18) from each other, in which the inner wall (16) and the outer wall (15) at the intermediate zone separating two of the successive circular ribs (18) from each other, not taking the indentations (17) into account, are distant from each other with an average distance between 1 mm and 40 mm, whereas the inner wall (16) and the outer wall (15) are distant from each other at the level of the circular ribs (18) by a maximum distance greater by at least 5 mm than the average distance between the inner wall (16) and the outer wall (15) at the intermediate zone separating two of the successive circular ribs (18) from each other, not taking the indentations (17) into account, in which the primary exchanger comprises a central portion including the at least two circular ribs (18) and the intermediate zone separating two of the successive circular ribs (18) from each other, and in which the average distance between the inner wall (16) and the outer wall (15), not taking into account the indentations (17), at the level of the said central portion of the primary exchanger varies between a minimum distance of between 1 mm and 5 mm, and a maximum distance of between 8 mm and 60 mm.

2. The facility of claim 1, in which the said inner wall (16) has a minimum average internal diameter of 20 cm.

3. The facility of claim 1, in which the inner wall (16) and the outer wall (15) at the intermediate zone separating two of the successive circular ribs (18) from each other, not taking the indentations (17) into account, are distant from each other with an average distance between 1 mm and 20 mm, whereas the inner wall (16) and the outer wall (15) are distant from each other at the level of the circular ribs (18) by a maximum distance greater by at least 5 mm than the average distance between the inner wall (16) and the outer wall (15) at the intermediate zone separating two of the successive circular ribs (18) from each other, not taking the indentations (17) into account.

4. The facility of claim 1, in which the inner wall (16) and the outer wall (15) at the intermediate zone separating two of the successive circular ribs (18) from each other, not taking the indentations (17) into account, are distant from each other with an average distance between 2 mm and 5 mm, whereas the inner wall (16) and the outer wall (15) are distant from each other at the level of the circular ribs (18) by a maximum distance greater by at least 5 mm than the average distance between the inner wall (16) and the outer wall (15) at the intermediate zone separating two of the successive circular ribs (18) from each other, not taking the indentations (17) into account.

5. The facility according to claim 1, and in which the average distance between the inner wall (16) and the outer wall (15), not taking into account the indentations (17), at the level of the said central portion of the primary exchanger varies between a minimum distance of between 2 mm and 4 mm, and a maximum distance of between 10 mm and 25 mm.

6. The facility of claim 1, in which at least one wall selected from the group consisting of the inner wall (16) and the outer wall (15) has a central area defining a revolution surface with a central axis (AX), said central area having the at least two successive circular ribs (18) which follow each other in such a way that, in a cross section in a plane passing through the central axis (AX) of the central area considered, each defines a series of elements selected from waves and undulations each being provided with a rounded peak and a rounded trough with a bottom end, defining between said rounded peak and rounded trough a height or depth (h) measured in a direction perpendicular to the central axis (AX) of the central area considered in relation to an average bottom level corresponding to the average of the bottom ends of rounded trough, said height or depth being comprised between 8 mm and 25 mm, whereas two successive peaks or bottom ends of troughs are distant from each other from a distance (EC) comprised between 2 and 10 times the said height or depth (h).

7. The facility of claim 6, in which the said series of elements is characterised by a pitch (P) comprised between 2 and 6 times the said height or depth (h).

8. The facility of claim 6, in which characterised in that, in order to provide a minimum distance between the inner wall and the outer wall, at least one of these walls (15, 16) has a series of lines (L1, L2) of indentations (17), each line of indentations extending substantially in a plane substantially perpendicular to the central axis (AX) of the central area of the wall considered, whereby for a first line of indentations extending in a first plane and a second line of indentations adjacent to the first line of indentations, said second line of indentations extending in a second plane, the said first plane and the said second plane being distant from each other by a distance of between 10 mm and 100 mm.

9. The facility of claim 8, in which the said first plane and the said second plane being distant from each other by a distance of between 30 mm and 70 mm.

10. The facility of claim 1, in which at least one wall selected from the group consisting of the inner wall (16) and the outer wall (15) has a central area defining a revolution surface with a central axis (AX), said central area having the at least two successive circular ribs (18) which follow each other in such a way that, in a cross section in a plane passing through the central axis (AX) of the central area considered, each defines a series of elements selected from waves and undulations each bring provided with a rounded peak and a rounded trough with a bottom end, defining between said rounded peak and rounded trough a height or depth (h) measured in a direction perpendicular to the central axis (AX) of the central area considered in relation to an average bottom level corresponding to the average of the bottom ends of rounded trough, said height or depth being comprised between 8 mm and 25 mm, whereas two successive peaks or two successive bottom ends of troughs are distant from each other from a distance (EC) comprised between 3 and 8 times the said height or depth (h).

11. The facility of claim 1, in which at least one wall selected from the group consisting of the inner wall (16) and the outer wall (15) has a central area defining a revolution surface with a central axis (AX), said central area having the at least two successive circular ribs (18) which follow each other in such a way that, in a cross section in a plane passing through the central axis (AX) of the central area considered, each defines a series of elements selected from waves and undulations each being provided with a rounded peak and a rounded trough with a bottom end, defining between said rounded peak and rounded trough a height or depth (h) measured in a direction perpendicular to the central axis (AX) of the central area considered in relation to an average bottom level corresponding to the average of the bottom ends of rounded trough, said height or depth being comprised between 8 mm and 25 mm, whereas two successive peaks or bottom ends of troughs are distant from each other from a distance (EC) comprised between 4 and 6 times the said height or depth (h).

12. The facility of claim 1, in which at least one wall selected from the group consisting of the inner wall (16) and the outer wall (15) has a central area comprising at least three circular ribs (18).

13. The facility of claim 1, in which at least one wall selected from the group consisting of the inner wall (16) and the outer wall (15) has a central area comprising at least three successive circular ribs (18).

14. The facility of claim 1, in which, in order to provide a minimum distance between the inner wall (16) and the outer wall (15), the said indentations (17) have a depth comprised between 1 and 10 mm.

15. The facility of claim 14, in which the said indentations (17) have a depth comprised between 2 and 8 mm.

16. The facility of claim 1, in which the indentations (17) are at a distance from each other, whereby two adjacent indentations are at a distance of less than 100 mm.

17. The facility of claim 1, in which the indentations (17) are at a distance from each other, whereby two adjacent indentations are at a distance comprised between 20 mm and 80 mm.

18. The facility of claim 1, in which the indentations (17) have a shape adapted for guiding the flow of the heat transfer fluid in the primary exchanger (10).

19. The facility of claim 1, in which at least a first primary exchanger (101) and a second primary exchanger (102) extends within the vessel chamber of the vessel 1, and in which said first primary exchanger and said second primary exchanger form a circuit selected from the group consisting of a circuit with the first and second primary exchangers mounted in parallel, a circuit with the first and second primary exchangers mounted in series, and combinations thereof.

20. A facility for heating a first liquid for producing a hot first liquid, said facility comprising at least:
 (a) a vessel (1) suitable for resisting an internal pressure of more than $3\ 10^5$ Pa and defining a vessel chamber intended to contain, under a pressure of more than $3\ 10^5$ Pa, said first liquid to be heated, this vessel (1) comprising: (i) an inlet (2) suitable for conveying the first liquid into the vessel chamber, and (ii) at least an outlet (3, 4) suitable for removing the hot first liquid, said vessel having an inner face intended to contact said first liquid to be heated, and
 (b) a primary exchanger (10) extending into the vessel chamber of the vessel (1), this exchanger (10) being suitable for a heat transfer fluid to circulate and comprising at least an inlet (11) to convey the heat transfer fluid into the primary exchanger and an outlet (12) to remove a heat transfer fluid after flowing through the primary exchanger (10),
 in which the primary exchanger (10) extending into the chamber of the vessel (1) is defined at least partly between (i) an inner wall (16) selected from a cylindrical inner wall and a tapering inner wall, said inner wall (16) having a minimum average internal diameter of 5 cm and a minimum height of 20 cm, and (ii) an outer wall (15) selected from a cylindrical outer wall and a tapering outer wall, said outer wall (15) having an average external diameter greater than the average internal diameter of the inner wall (16) and a minimum height of 20 cm, said outer wall of the primary exchanger being distant from the inner face of the vessel, these inner and outer walls (15, 16) being at a distance from each other in order to form between them a heating chamber with a minimum height of 20 cm intended for the heat transfer fluid to flow,
 in which at least one wall selected from the group consisting of the inner wall (16) and the outer wall (15) has an area having at least two successive circular ribs (18) separated from each other by an intermediate zone selected from an intermediate line and an intermediate area, and
 in which a first wall selected from the group consisting of the outer wall (15) and the inner wall (16) has a series of indentations (17) towards the other wall selected from the group consisting of the inner wall (16) and the outer wall (15), these indentations (17) being at a distance from each other and forming areas of support for said first wall selected from the group consisting of the outer wall (15) and the inner wall (16), on the other wall selected from the group consisting of the inner wall (16) and the outer wall (15) in order to provide a minimum distance between the inner wall (16) and the outer wall (15) at least for the intermediate zone separating two of the successive circular ribs (18) from each other,
 in which the circular ribs (18) of a wall are situated in a central area situated between a first substantially cylindrical area (16A) and a second substantially cylindrical area (16B) of the wall considered, and in which at least a substantially cylindrical area selected from the group consisting of the first substantially cylindrical area (16A) and the second substantially cylindrical area of the wall considered is at a distance from the other wall, by a distance of less than 5 mm, at least near the said central area.

21. The facility of claim 20, in which a central chamber (22) is formed between the central area (16B) and the other wall, in which the first cylindrical area (16A) of the wall considered, together with the other wall, forms a distribution chamber (20) for heat transfer fluid in the central chamber (22), and in which the second cylindrical area (16C), together with the other wall, forms a collector (21) collecting heat transfer fluid leaving the central chamber (22).

22. A facility for heating a first liquid for producing a hot first liquid, said facility comprising at least:
(a) a vessel (1) suitable for resisting an internal pressure of more than $3\ 10^5$ Pa and defining a vessel chamber intended to contain, under a pressure of more than $3\ 10^5$ Pa, said first liquid to be heated, this vessel (1) comprising: (i) an inlet (2) suitable for conveying the first liquid into the vessel chamber, and (ii) at least an outlet (3, 4) suitable for removing the hot first liquid, said vessel having an inner face intended to contact said first liquid to be heated, and
(b) a primary exchanger (10) extending into the vessel chamber of the vessel (1), this exchanger (10) being suitable for a heat transfer fluid to circulate and comprising at least an inlet (11) to convey the heat transfer fluid into the primary exchanger and an outlet (12) to remove a heat transfer fluid after flowing through the primary exchanger (10),
in which the primary exchanger (10) extending into the chamber of the vessel (1) is defined at least partly between (i) an inner wall (16) selected from a cylindrical inner wall and a tapering inner wall, said inner wall (16) having a minimum average internal diameter of 5 cm and a minimum height of 20 cm, and (ii) an outer wall (15) selected from a cylindrical outer wall and a tapering outer wall, said outer wall (15) having an average external diameter greater than the average internal diameter of the inner wall (16) and a minimum height of 20 cm, said outer wall of the primary exchanger being distant from the inner face of the vessel, these inner and outer walls (15, 16) being at a distance from each other in order to form between them a heating chamber with a minimum height of 20 cm intended for the heat transfer fluid to flow,
in which at least one wall selected from the group consisting of the inner wall (16) and the outer wall (15) has an area having at least two successive circular ribs (18) separated from each other by an intermediate zone selected from an intermediate line and an intermediate area,
in which a first wall selected from the group consisting of the outer wall (15) and the inner wall (16) has a series of indentations (17) towards the other wall selected from the group consisting of the inner wall (16) and the outer wall (15), these indentations (17) being at a distance from each other and forming areas of support for said first wall selected from the group consisting of the outer wall (15) and the inner wall (16), on the other wall selected from the group consisting of the inner wall (16) and the outer wall (15) in order to provide a minimum distance between the inner wall (16) and the outer wall (15) at least for the intermediate zone separating two of the successive circular ribs (18) from each other,
in which the inner wall (16) comprises a central area (16B) having at least two circular ribs (18) separated from each other by an intermediate zone and situated between a first cylindrical area (16A) of the inner wall (16) and a second cylindrical area (16C) of the inner wall (16),
in which the outer wall (15) has a series of indentations (17) towards the inner wall (16), these indentations (17) at a distance from each other forming support elements for the outer wall (15) on the inner wall in order to provide a minimum distance between the inner wall (16) and the outer wall (15), and
in which the outer wall (15) is cylindrical without having circular ribs.

23. A primary exchanger (10) for a facility for heating a first liquid for producing a hot first liquid, said facility comprising at least:
(a) a vessel (1) suitable for resisting an internal pressure of more than $3\ 10^5$ Pa and defining a vessel chamber intended to contain, under a pressure of more than $3\ 10^5$ Pa, said first liquid to be heated, this vessel (1) comprising: (i) an inlet (2) suitable for conveying the first liquid into the vessel chamber, and (ii) at least an outlet (3, 4) suitable for removing the hot first liquid, said vessel having an inner face intended to contact said first liquid to be heated, and
(b) a primary exchanger (10) extending into the vessel chamber of the vessel (1), this exchanger (10) being suitable for a heat transfer fluid to circulate and comprising at least an inlet (11) to convey the heat transfer fluid into the primary exchanger and an outlet (12) to remove a heat transfer fluid after flowing through the primary exchanger (10),
said primary exchanger (10) being suitable for a heat transfer fluid to circulate and comprising at least an inlet (11) to convey the heat transfer fluid into the primary exchanger and an outlet (12) to remove a heat transfer fluid after flowing through the primary exchanger (10),
in which the primary exchanger (10) extending into the chamber of the vessel (1) is defined at least partly between (i) an inner wall (16) selected from a cylindrical inner wall and a tapering inner wall, said inner wall (16) having a minimum average internal diameter of 5 cm and a minimum height of 20 cm, and (ii) an outer wall (15) selected from a cylindrical outer wall and a tapering outer wall, said outer wall (15) having an average external diameter greater than the average internal diameter of the inner wall (16) and a minimum height of 20 cm, these inner and outer walls (15, 16) being at a distance from each other in order to form between them a heating chamber with a minimum height of 20 cm intended for the heat transfer fluid to flow,
in which at least one wall selected from the group consisting of the inner wall (16) and the outer wall (15) has an area having at least two successive circular ribs (18) separated from each other by an intermediate zone selected from an intermediate line and an intermediate area, and
in which a first wall selected from the group consisting of the outer wall (15) and the inner wall (16) has a series of indentations (17) towards the other wall selected from the group consisting of the inner wall (16) and the outer wall (15), these indentations (17) being at a distance from each other and forming areas of support for said first wall selected from the group consisting of the outer wall (15) and the inner wall (16), on the other wall selected from the group consisting of the inner wall (16) and the outer wall (15) in order to provide a minimum distance between the inner wall (16) and the outer wall (15) at least for the intermediate zone separating two of the successive circular ribs (18) from each other, in which the inner wall (16) and the outer wall (15) at the intermediate zone separating two of the successive circular ribs (18) from each other, not taking the indentations (17) into account, are distant from each other with an average distance between 1 mm and 40 mm, whereas the inner wall (16) and the outer wall (15) are distant from each other at the level of the circular ribs (18) by a maximum distance greater by at least 5 mm than the average distance between the inner wall (16) and the outer wall (15) at the intermediate zone separating two of the successive circular ribs (18) from each other, not taking the indentations (17) into account, in which the primary exchanger comprises a central portion including the at least two circular ribs (18) and the intermediate zone separating two of the successive circular ribs (18) from each other, and in which the average distance between the inner wall (16) and the outer wall (15), not taking into account the indentations (17), at the level of the said central portion of the primary exchanger varies between a minimum distance of between 1 mm and 5 mm, and a maximum distance of between 8 mm and 60 mm.

24. The primary exchanger of claim 23, in which the inner wall (16) and the outer wall (15) at the intermediate zone separating two of the successive circular ribs (18) from each other, not taking the indentations (17) into account, are distant from each other with an average distance between 1 mm and 40 mm, whereas the inner wall (16) and the outer wall (15) are distant from each other at the level of the circular ribs (18) by a maximum distance greater by at least 5 mm than the average distance between the inner wall (16) and the outer wall (15) at the intermediate zone separating two of the successive circular ribs (18) from each other, not taking the indentations (17) into account.

25. A method for producing hot water selected from the group consisting of hot water for central heating and hot water for domestic sanitary use, by using a facility for heating water for producing hot water, said facility comprising at least:
(a) a vessel (1) suitable for resisting an internal pressure of more than 3 10⁵ Pa and defining a vessel chamber intended to contain, under a pressure of more than 3 10⁵ Pa, said water to be heated, this vessel (1) comprising: (i) an inlet (2) suitable for conveying water to be heated into the vessel chamber, and (ii) at least an outlet (3, 4) suitable for removing hot water, and
(b) a primary exchanger (10) extending into the vessel chamber of the vessel (1), this exchanger (10) being suitable for a heat transfer fluid to circulate and comprising at least an inlet (11) to convey the heat transfer fluid into the primary exchanger and an outlet (12) to remove a heat transfer fluid after flowing through the primary exchanger (10),
in which the primary exchanger (10) extending into the chamber of the vessel (1) is defined at least partly between (*) an inner wall (16) selected from a substantially cylindrical inner wall and a substantially tapering inner wall, said inner wall (16) having a minimum average internal diameter of 5 cm and a minimum height of 20 cm, and (*) an outer wall (15) selected from a substantially cylindrical outer wall and a substantially tapering outer wall, said outer wall (15) having an average external diameter greater than the average internal diameter of the inner wall (16) and a minimum height of 20 cm, these inner and outer walls (15, 16) being at a distance from each other in order to form between them a heating chamber with a minimum height of 20 cm intended for the heat transfer fluid to flow,
in which at least one wall selected from the group consisting of the inner wall (16) and the outer wall (15) has an area having at least two successive circular ribs (18) separated from each other by an intermediate zone selected from an intermediate line and an intermediate area, and
in which a first wall selected from the group consisting of the outer wall (15) and the inner wall (16) has a series of indentations (17) towards the other wall selected from the group consisting of the inner wall (16) and the outer wall (15), these indentations (17) being at a distance from each other and forming areas of support for a first wall selected from the group consisting of the outer wall (15) and the inner wall (16), on the other wall selected from the group consisting of the inner wall (16) and the outer wall (15) in order to provide a minimum distance between the inner wall (16) and the outer wall (15) at least for the intermediate zone separating from each other two successive circular ribs (18), said method comprising the steps of:
water to be heated is introduced within the vessel (1) under a pressure of more than 3 10⁵ Pa via the inlet (2);
heat transfer fluid is circulating in the primary exchanger (10) between its inlet (11) and its outlet (12), whereby heating the water present in the vessel (1) and producing hot water in the vessel (1);
hot water is removed from the vessel (1) via at least one of said at least one outlet (3,4) suitable for removing hot water from the vessel (1).

26. A primary exchanger (10) for a facility for heating a first liquid for producing a hot first liquid, said facility comprising at least:
(a) a vessel (1) suitable for resisting an internal pressure of more than 3 10⁵ Pa and defining a vessel chamber intended to contain, under a pressure of more than 3 10⁵ Pa, said first liquid to be heated, this vessel (1) comprising: (i) an inlet (2) suitable for conveying the first liquid into the vessel chamber, and (ii) at least an outlet (3, 4) suitable for removing the hot first liquid, said vessel having an inner face intended to contact said first liquid to be heated, and
(b) a primary exchanger (10) extending into the vessel chamber of the vessel (1), this exchanger (10) being suitable for a heat transfer fluid to circulate and comprising at least an inlet (11) to convey the heat transfer fluid into the primary exchanger and an outlet (12) to remove a heat transfer fluid after flowing through the primary exchanger (10),
said primary exchanger (10) being suitable for a heat transfer fluid to circulate and comprising at least an inlet (11) to convey the heat transfer fluid into the primary exchanger and an outlet (12) to remove a heat transfer fluid after flowing through the primary exchanger (10),
in which the primary exchanger (10) extending into the chamber of the vessel (1) is defined at least partly between (i) an inner wall (16) selected from a cylindrical inner wall and a tapering inner wall, said inner wall (16) having a minimum average internal diameter of 5 cm and a minimum height of 20 cm, and (ii) an outer wall (15) selected from a cylindrical outer wall and a tapering outer wall, said outer wall (15) having an average external diameter greater than the average internal diameter of the inner wall (16) and a minimum height of 20 cm, these inner and outer walls (15, 16) being at a distance from each other in order to form between them a heating chamber with a minimum height of 20 cm intended for the heat transfer fluid to flow, in which at least one wall selected from the group consisting of the inner wall (16) and the outer wall (15) has an area having at least two successive circular ribs (18) separated from each other by an intermediate zone selected from an intermediate line and an intermediate area, and in which a first wall selected from the group consisting of the outer wall (15) and the inner wall (16) has a series of indentations (17) towards the other wall selected from the group consisting of the inner wall (16) and the outer wall (15), these indentations (17) being at a distance from each other and forming areas of support for said first wall selected from the group consisting of the outer wall (15) and the inner wall (16), on the other wall selected from the group consisting of the inner wall (16) and the outer wall (15) in order to provide a minimum distance between the inner wall (16) and the outer wall (15) at least for the intermediate zone separating two of the successive circular ribs (18) from each other, in which the circular ribs (18) of a wall are situated in a central area situated between a first cylindrical area (16A) and a second cylindrical area (16B) of the wall considered, and in which at least a cylindrical area selected from the group consisting of the first cylindrical area (16A) and the second cylindrical area of the wall considered is at a distance from the other wall, by a distance of less than 5 mm, at least near the said central area.

27. A primary exchanger (10) for a facility for heating a first liquid for producing a hot first liquid, said facility comprising at least:
(a) a vessel (1) suitable for resisting an internal pressure of more than $3 \cdot 10^5$ Pa and defining a vessel chamber intended to contain, under a pressure of more than $3 \cdot 10^5$ Pa, said first liquid to be heated, this vessel (1) comprising: (i) an inlet (2) suitable for conveying the first liquid into the vessel chamber, and (ii) at least an outlet (3, 4) suitable for removing the hot first liquid, said vessel having an inner face intended to contact said first liquid to be heated, and
(b) a primary exchanger (10) extending into the vessel chamber of the vessel (1), this exchanger (10) being suitable for a heat transfer fluid to circulate and comprising at least an inlet (11) to convey the heat transfer fluid into the primary exchanger and an outlet (12) to remove a heat transfer fluid after flowing through the primary exchanger (10), said primary exchanger (10) being suitable for a heat transfer fluid to circulate and comprising at least an inlet (11) to convey the heat transfer fluid into the primary exchanger and an outlet (12) to remove a heat transfer fluid after flowing through the primary exchanger (10), in which the primary exchanger (10) extending into the chamber of the vessel (1) is defined at least partly between (i) an inner wall (16) selected from a cylindrical inner wall and a tapering inner wall, said inner wall (16) having a minimum average internal diameter of 5 cm and a minimum height of 20 cm, and (ii) an outer wall (15) selected from a cylindrical outer wall and a tapering outer wall, said outer wall (15) having an average external diameter greater than the average internal diameter of the inner wall (16) and a minimum height of 20 cm, these inner and outer walls (15, 16) being at a distance from each other in order to form between them a heating chamber with a minimum height of 20 cm intended for the heat transfer fluid to flow, in which at least one wall selected from the group consisting of the inner wall (16) and the outer wall (15) has an area having at least two successive circular ribs (18) separated from each other by an intermediate zone selected from an intermediate line and an intermediate area, and in which a first wall selected from the group consisting of the outer wall (15) and the inner wall (16) has a series of indentations (17) towards the other wall selected from the group consisting of the inner wall (16) and the outer wall (15), these indentations (17) being at a distance from each other and forming areas of support for said first wall selected from the group consisting of the outer wall (15) and the inner wall (16), on the other wall selected from the group consisting of the inner wall (16) and the outer wall (15) in order to provide a minimum distance between the inner wall (16) and the outer wall (15) at least for the intermediate zone separating two of the successive circular ribs (18) from each other, in which the inner wall (16) comprises a central area (16B) having at least two circular ribs (18) separated from each other by an intermediate zone and situated between a first cylindrical area (16A) of the inner wall (16) and a second cylindrical area (16C) of the inner wall (16), in which the outer wall (15) has a series of indentations (17) towards the inner wall (16), these indentations (17) at a distance from each other forming support elements for the outer wall (15) on the inner wall in order to provide a minimum distance between the inner wall (16) and the outer wall (15), and in which the outer wall (15) is cylindrical without having circular ribs.

* * * * *